(12) United States Patent
Ikeda et al.

(10) Patent No.: US 8,730,483 B2
(45) Date of Patent: May 20, 2014

(54) INTERFEROMETRIC MEASUREMENT OF DISPLACEMENT IN AXIAL DIRECTION OF A GRATING

(75) Inventors: Masato Ikeda, Tokyo (JP); Katsuhiro Oyama, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 13/438,615

(22) Filed: Apr. 3, 2012

(65) Prior Publication Data

US 2012/0250031 A1 Oct. 4, 2012

Related U.S. Application Data

(63) Continuation of application No. PCT/JP2010/067487, filed on Oct. 5, 2010.

(30) Foreign Application Priority Data

Oct. 5, 2009 (JP) ................................. 2009-231845
Mar. 31, 2010 (JP) ................................. 2010-084081

(51) Int. Cl.
*G01B 9/02* (2006.01)

(52) U.S. Cl.
USPC ......................................................... 356/499

(58) Field of Classification Search
USPC .................. 356/499, 494, 488, 503
See application file for complete search history.

(56) References Cited

U.S. PATENT DOCUMENTS

| 3,921,745 | A | | 11/1975 | McCulloch et al. |
| 4,815,850 | A | * | 3/1989 | Kanayama et al. ............ 356/488 |
| 5,333,048 | A | * | 7/1994 | Michel et al. ................. 356/494 |
| 5,474,148 | A | | 12/1995 | Takata |
| 6,155,369 | A | | 12/2000 | Whittaker |
| 6,320,336 | B1 | | 11/2001 | Eguchi |
| 6,371,574 | B1 | | 4/2002 | Hageman et al. |
| 6,446,745 | B1 | | 9/2002 | Lee et al. |
| 6,657,181 | B1 | | 12/2003 | Ishizuka et al. |
| 6,933,836 | B2 | | 8/2005 | Hsu |
| 7,019,842 | B2 | * | 3/2006 | Holzapfel et al. ............ 356/499 |
| 7,779,948 | B2 | | 8/2010 | Gulas |

(Continued)

FOREIGN PATENT DOCUMENTS

| DE | 102 50 645 A1 | 7/2003 |
| DE | 10 2006 019494 A1 | 10/2007 |

(Continued)

OTHER PUBLICATIONS

U.S. Appl. No. 13/438,654, filed Apr. 3, 2012.

(Continued)

*Primary Examiner* — Hwa Lee
(74) *Attorney, Agent, or Firm* — Chen Yoshimura LLP

(57) ABSTRACT

A displacement measurement device includes a first diffraction grating that generates first diffraction light of a prescribed order; a second diffraction grating movable relative to the first diffraction grating, the second diffraction grating dividing the zeroth-order light that has passed through the first diffraction grating into zeroth-order light and a second diffraction light of a prescribed order; and a first optical sensor that detects interfering light beams formed by the first diffraction light from the first diffraction grating and the second diffraction light from the second diffraction grating to determine an amount of a displacement of the second diffraction grating relative to the first diffraction grating.

24 Claims, 18 Drawing Sheets

(56) References Cited

U.S. PATENT DOCUMENTS

| | | |
|---|---|---|
| 2001/0017696 A1* | 8/2001 | Narita et al. ............... 356/499 |
| 2004/0027105 A1 | 2/2004 | Nakamura et al. |
| 2004/0084238 A1 | 5/2004 | Yokotani et al. |
| 2006/0139616 A1 | 6/2006 | Jacobs et al. |
| 2007/0126284 A1 | 6/2007 | Swain et al. |
| 2007/0229843 A1 | 10/2007 | Sesko |

FOREIGN PATENT DOCUMENTS

| | | |
|---|---|---|
| DE | 10 2007 051559 A1 | 4/2009 |
| EP | 0 647 556 A2 | 4/1995 |
| EP | 1 415 904 A2 | 5/2004 |
| JP | 62-35223 A | 2/1987 |
| JP | 3-279812 A | 12/1991 |
| JP | H5-72088 A | 3/1993 |
| JP | 7-83612 A | 3/1995 |
| JP | H7-101375 A | 4/1995 |
| JP | 2623419 B2 | 6/1997 |
| JP | 9-254861 A | 9/1997 |
| JP | 9-308281 A | 11/1997 |
| JP | 2000-258124 A | 9/2000 |
| JP | 2000-356509 A | 12/2000 |
| JP | 2001-33209 A | 2/2001 |
| JP | 3317096 B2 | 8/2002 |
| JP | 2003-204602 A | 7/2003 |
| JP | 2004-149001 A | 5/2004 |
| JP | 2005-153842 A | 6/2005 |
| JP | 2007-271624 A | 10/2007 |
| JP | 2009-231845 A | 10/2009 |
| WO | 2011/043354 A1 | 4/2011 |

OTHER PUBLICATIONS

International Search Report (ISR) issued in PCT/JP2010/066342 (of the related U.S. Appl. No. 13/438,654) mailed in Dec. 2010.
Written Opinion (PCT/ISA/237) issued in PCT/JP2010/066342 (of the related U.S. Appl. No. 13/438,654) mailed in Dec. 2010.
International Search Report (ISR) issued in PCT/JP2010/067487 mailed in Dec. 2010.
European Search Report dated Jul. 2, 2013, in a counterpart European patent application No. 10821857.9 (of the related U.S. Appl. No. 13/438,654).
Japanese Office Action dated Sep. 10, 2013, in a counterpart Japanese patent application No. 2011-535409.
Japanese Office Action (of the related U.S. Appl. No. 13/438,654) dated May 7, 2013, in a counterpart Japanese patent application No. 2009-231908.

* cited by examiner (A)

(B-1)   (B-2)

(C)

(D)

(A)

(B)

(A)

(B)

(C)

Signal output (A)

(B)

(C)

(D)

(E)

(A)

(B)

(A)

(B)

(C)

(A)

(B)

(C)

Detection range

±80% of amplitude (A)

(B)

(C)

(A)

(B)

(A)

(B)

(C)

(A)

(B)

(A)

(B)

(A)

(B)

(C)

Distance = one wavelength ×
number of bright and dark lines × 2

INTERFEROMETRIC MEASUREMENT OF DISPLACEMENT IN AXIAL DIRECTION OF A GRATING

This application is a continuation of PCT International Application No. PCT/JP2010/067487 designating the United States, filed Oct. 5, 2010, which claims the benefit of Japanese Application No. 2009-231845, filed in Japan on Oct. 5, 2009, and Japanese Application No. 2010-084081, filed in Japan on Mar. 31, 2010. These applications are hereby incorporated by reference in their entireties.

The present application also hereby incorporates by reference PCT International Application No. PCT/JP2010/066342, filed in Japan on Sep. 22, 2010, which claims the benefit of Japanese Application No. 2009-231908, filed in Japan on Oct. 5, 2009 in their entireties.

TECHNICAL FIELD

The present invention relates to a displacement measurement method and a displacement measurement device that utilize optical interference, and more particularly, to an expansion of a measuring range.

BACKGROUND ART

In recent years, from ecological and health standpoints, a bicycle equipped with an electric assist is drawing attention among those who have been using cars for transportation. Among such electric assist bicycles, an increased focus has been on bicycles that are capable of driving a longer distance with a single charge, and charging a battery with the regenerative energy in particular. Against this background, bicycles that are configured to start the regenerative charging in a braking operation after the braking action is actuated are generally available. However, when the regenerative charging is started after the braking action is activated, the energy utilization efficiency becomes low. Therefore, it is more convenient if the regenerative charging can be initiated prior to the actuation of the braking action when a user of the bicycle starts squeezing a brake lever so as to apply brakes. In order to do so, it is necessary to provide an instrument that is capable of detecting a point where the user starts squeezing the brake lever before the braking action is activated, which is when the brake wire is under tension, and that is capable of measuring a very small amount of movement that is proportional to the tension in the brake wire, i.e., a displacement amount.

FIGS. 17(A) and 17(B) show a relationship between a brake lever operation amount and a braking force of an electric assist vehicle. In the above-mentioned electric assist bicycle and the like, when the user starts squeezing the brake lever, the brake lever operation amount in a play stage where the manual brake has not yet engaged shown in FIG. 17(A) needs to be measured in accordance with the amount of movement of the brake wire, and then, a mechanical brake actuation point P1, which is a point where the brake is applied by brake pads to slow or stop the spinning wheel, needs to be detected based on a stretched amount of the brake wire. This operation is necessary because if the control of the regenerative brake and the control of the mechanical brake are not coordinated smoothly before and after the brake actuation point, a driver including a passenger may feel strangeness as if the brake was applied abruptly, or may feel a lack of the braking force.

In particular, in a brake of the electric assist bicycle and the like, it is very likely that the amount of play is changed when the driver replaces the wire or makes adjustment for the wire tension, which causes the brake lever operation amount required to actuate the mechanical brake to change from the point shown as the mechanical brake actuation point P1 to a point P2 in FIG. 17(B). Conventionally, only the brake lever operation amount has been detected, and the point where the operation amount reaches a prescribed required operation amount to start the mechanical brake has been determined as the start of the mechanical brake. This configuration has a problem in that if the user makes the adjustment and the mechanical brake actuation point is shifted to the point P2 as described above, the mechanical brake actuation point P2 cannot be detected, and as a result, the control between the regenerative brake and the mechanical brake cannot be conducted smoothly. Thus, in order to maximize the efficiency of the regenerative charging, it is desirable to employ a system structure that is capable of directly detecting the mechanical brake start point by measuring both the brake wire movement amount and the brake wire stretched amount simultaneously or chronologically.

As a method of measuring a very small displacement such as the amount of movement or the stretched amount of the brake wire, an optical interferometer has been conventionally used. A Michelson interferometer 300 shown in FIG. 18(A) includes a laser light source 302, a collimator lens 304 that turns laser light into parallel light, a splitter 306 that divides a beam into two beams, one of which is reflected toward a stationary mirror 308, and the other is reflected toward a moveable mirror 310, and that makes the two reflected light rays interfered, and an optical sensor 312. In the Michelson interferometer 300, when the moveable minor 310 moves relative to the stationary unit 314 in the direction of the beam by one wavelength, bright and dark lines appear on a detector twice. These bright and dark lines are observed as an interference pattern 316 as shown in FIG. 18(B), and a displacement that is equal to or smaller than one wavelength can be detected by reading the voltage values of the respective bright and dark lines. A displacement that is equal to or greater than one wavelength can be measured by determining the number of occurrence of the light and dark lines (interference patterns). That is, with respect to a movement of the minor, the path difference is doubled in a round-trip of the light, the displacement (travel distance) can be determined by "one wavelength×the number of light and dark lines×2" as shown in FIG. 18(C) (a mechanism for detecting a direction of the movement is also required). Such techniques utilizing the optical interference include the phase difference detector and the phase difference detecting method described in Patent Document 1 below, for example.

RELATED ART DOCUMENTS

Patent Documents

Patent Document 1: Japanese Patent Application Laid-Open Publication No. 2007-271624

SUMMARY OF THE INVENTION

However, when the above-mentioned optical interferometer is used, the following problems are caused.

(1) Because the measuring range is determined by the optical wavelength, a range that is equal to or greater than the optical wavelength is measured by counting the wavelengths of the light that has passed, and therefore, the resolution that is equal to or smaller than the optical wavelength cannot be obtained.

(2) Very high positional accuracy of optical parts is required. Even when an angle is off by as small as the order of 0.01 degree, or a position is off by as small as the submicron order, an accurate measurement may not be achieved. This creates a need to take a preventive measure for an erroneous detection caused by a usage environment such as a temperature change, a humidity change, external vibrations, and age.

(3) Because the optical interferometer must include a collimator lens, a combination of mirrors, and a splitter, it is difficult to reduce the size.

(4) Displacement measurements at different detection sensitivities and detection positions, such as a measurement of the amount of movement and the stretched amount of the brake wire in the electric assist bicycle, for example, cannot be performed simultaneously or chronologically.

The present invention was made in view of the above-mentioned points, and it is an object of the present invention to provide a displacement measurement method and a displacement measurement device that have a simple configuration allowing for reduction in size, that are not affected by inclination accuracy of optical elements or by positional variations of a diffraction grating in a surface direction, and that enable an adjustment of the optical resolution. Another object is to provide a displacement measurement method and a displacement measurement device that can measure displacements at different detection sensitivities and detection positions simultaneously or chronologically.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, a displacement measurement method according to the present invention includes: turning light emitted from a light source into parallel light by a collimator lens; dividing the parallel light by a first diffraction grating disposed on an optical axis of the parallel light into zeroth-order light, which travels in the same direction as that of the parallel light, and ±nth-order light having diffraction angles relative to the zeroth-order light, where n is a positive integer of 1 or greater; dividing, by a second diffraction grating, the zeroth-order light and the ±nth-order light that have passed through the first diffraction grating into zeroth-order light and ±nth-order light, the second diffraction grating having a same grating pitch as the first diffraction grating and being disposed so as to face and be movable relative to the first diffraction grating; receiving, by a first optical sensor, among diffracted light rays that have passed through the first and second diffraction gratings, at least one pair of interfering light rays travelling along an optical axis of one of the zeroth-order light, the positive nth-order light, and the negative nth-order light from the first diffraction grating to detect an amount of light received; and determining an amount of a displacement between the first and second diffraction gratings in the direction of the optical axis of the parallel light on a basis of the amount of light received by the first optical sensor. In one of main aspects of the present invention, the first and second diffraction gratings are provided with a grating pattern in which light intensity ratios of diffracted light rays are adjusted such that that zeroth-order light and ±first-order light can be used for measuring a displacement between the first and second diffraction gratings in the optical axis direction of the parallel light.

In another aspect, the displacement measurement method further includes: dividing, by a third diffraction grating, the zeroth-order light from the second diffraction grating, into zeroth-order light and ±nth-order light, the third diffraction grating being disposed separately from the first and second diffraction gratings on the same optical axis direction as the optical axis of the first and second diffraction gratings and having a grating pitch different from that of the first and second diffraction gratings; dividing, by a fourth diffraction grating, the zeroth-order light and the ±nth-order light that have passed through the third diffraction grating into zeroth-order light and ±nth-order light, the fourth diffraction grating having a same grating pitch as that of the third diffraction grating and being disposed to so as to face and be movable relative to the third diffraction grating; receiving, by a second optical sensor, among diffracted light rays that have passed through the third and fourth diffraction gratings, at least one pair of interfering light rays travelling along an optical axis of one of the zeroth-order light, the positive nth-order light, and the negative nth-order light from the third diffraction grating to detect an amount of light received; determining an amount of a displacement between the third and fourth diffraction gratings in the direction of the optical axis of the parallel light on a basis of the amount of light received by the second optical sensor. In yet another aspect, the third and fourth diffraction gratings are provided with a grating pattern in which light intensity ratios of diffracted light rays are adjusted such that that zeroth-order light and ±first-order light can be used for measuring a displacement between the third and fourth diffraction gratings in the optical axis direction of the parallel light.

A displacement measurement device according to the present invention includes: a light source; a collimator lens for converting light emitted from the light source to parallel light; a first diffraction grating disposed on an optical axis of the parallel light, the first diffraction grating dividing the parallel light into zeroth-order light and ±nth-order light; a second diffraction grating that has a same grating pitch as that of the first diffraction grating and that is disposed so as to face and be movable relative to the first diffraction grating, the second diffraction grating dividing the zeroth-order light and the ±nth-order light that have passed through the first diffraction grating, into zeroth-order light and ±nth-order light; and a first optical sensor that receives, among diffracted light rays that have passed through the first and second diffraction gratings, at least one pair of interfering light beams travelling along an optical axis of one of the diffracted light rays of zeroth-order light, positive nth-order light, and negative nth-order light from the first diffraction grating to detects an amount of light received light amount for determining an amount of a displacement the second diffraction grating relative to the first diffraction grating in the direction of the optical axis of the parallel light. In one of main aspects, the first and second diffraction gratings are provided with a grating pattern in which light intensity ratios of diffracted light rays are adjusted such that that zeroth-order light and ±first-order light can be used for measuring a displacement between the first and second diffraction gratings in the optical axis direction of the parallel light.

In another aspect, the displacement measurement device of the present invention includes: a phase plate creating a step on a diffraction surface of the second diffraction grating; a dual-element optical sensor as the optical sensor; and a calculation unit that processes two signals that are output from the dual-element optical sensor. Alternatively, in the displacement measurement device, the second diffraction grating has two areas that respectively include grating patterns having a same grating pitch, and the entire grating pattern of one of the areas is offset relative to the grating pattern of the other area by an offset amount that is one of one-half, one-quarter, and three-quarter of the grating pitch, and the displacement measurement device further includes: a dual-element optical sensor as the optical sensor; and a calculation unit that processes two signals that are output from the dual-element optical sensor. In yet another aspect, the light source, the collimator lens, the first diffraction grating, the second diffraction grating, and the first optical sensor are provided in spaces formed inside of a transparent resin molded body, and the transparent resin molded body has a spring characteristic that allows the transparent resin molded body to expand and shrink between the first diffraction grating and the second diffraction grating while keeping the first and second diffraction gratings in parallel with each other.

Another aspect of the displacement measurement device includes: a third diffraction grating that is disposed separately from the first and second diffraction gratings on the same optical axis direction as the optical axis of the first and second diffraction gratings and that has a grating pitch different from that of the first and second diffraction gratings, the third diffraction grating dividing the zeroth-order light that has passed through the second diffraction grating into zeroth-order light that travels straight and ±nth-order light; a fourth diffraction grating that has a same grating pitch as that of the third diffraction grating and that is disposed so as to face and be moveable relative to the third diffraction grating, the fourth diffraction grating dividing the zeroth-order light and the ±nth-order light that have passed through the third diffraction grating into zeroth-order light that travels straight and ±nth-order light; and a second optical sensor that receives, among diffracted light rays that have passed through the third and fourth diffraction gratings, at least one pair of interfering light rays travelling along an optical axis of one of the zeroth-order light, the positive nth-order light, and the negative nth-order light from the third diffraction grating to detects an amount light received for determining an amount of a displacement of the fourth diffraction grating relative to the third diffraction grating in the direction of the optical axis of the parallel light. In one of main aspects, wherein the third and fourth diffraction gratings are provided with a grating pattern in which light intensity ratios of diffracted light rays are adjusted such that that zeroth-order light and ±first-order light can be used for measuring a displacement between the third and fourth diffraction gratings in the optical axis direction of the parallel light.

In another aspect, the displacement measurement device includes: a phase plate creating a step on one of a diffraction surface of the second diffraction grating and a diffraction surface of the fourth diffraction grating; a dual-element optical sensor as at least one of the first and second optical sensors; and a calculation unit that processes two signals that are output from the dual-element optical sensor. Alternatively, in the displacement measurement device, one of the first and second diffraction gratings and one of the third and fourth diffraction gratings are provided with two areas that respectively include grating patterns having a same grating pitch, and the entire grating pattern of one of the areas is offset relative to the grating pattern of the other area by an offset amount that is one of one-half, one-quarter, and three-quarter of the grating pitch. The displacement measurement device further includes: a dual-element optical sensor as at least one of the first and second optical sensors; and a calculation unit that processes two signals that are output from the dual-element optical sensor.

In yet another aspect, the light source, the collimator lens, the first diffraction grating, the second diffraction grating, and the first optical sensor are provided in spaces formed inside of a transparent resin molded body. The third diffraction grating is disposed on one end surface of the transparent resin molded body, and the fourth diffraction grating and the second optical sensor are disposed outside of the transparent resin molded body such that the fourth diffraction grating faces the third diffraction grating. The transparent resin molded body has a spring characteristic that allows the transparent resin molded body to expand and shrink between the first diffraction grating and the second diffraction grating while keeping the first and second diffraction gratings in parallel with each other, and the fourth diffraction grating is moveable relative to the transparent resin molded body. Yet another aspect of the present invention is a device for measuring a displacement of a first point relative to a second point, the first point being moveable relative to the second point in a first direction, the device including: a light source emitting substantially parallel light, the parallel light being substantially in parallel to the first direction and having a spatial coherence; a first diffraction grating fixed relative to the first point and disposed on an optical axis of the parallel light, the first diffraction grating receiving the parallel light and diffracting a portion of the parallel light to transmit first diffraction light of a prescribed diffraction order in a second direction, the first diffraction grating transmitting a portion of the parallel light as zeroth-order light in the first direction; a second diffraction grating that has a same grating pitch as that of the first diffraction grating, the second diffraction being fixed relative to the second point and disposed so as to face the first diffraction grating, the second diffraction grating receiving the zeroth-order light transmitted from the first diffraction grating and diffracting the received zeroth-order light to transmit second diffraction light of the prescribed diffraction order in the second direction; an optical sensor disposed to receive the first diffraction light and the second diffraction light to output a signal representing an interference between the first diffraction light and the second diffraction light; and a calculation unit that processes the signal representing the interference between the first diffraction light and the second diffraction light to determine an amount of the displacement of the first point relative to the second point.

The above-mentioned and other objectives, features, and advantages of the present invention will become apparent from the detailed descriptions that follow and the accompanying drawings.

It is to be understood that both the foregoing general description and the following detailed description are exemplary and explanatory, and are intended to provide further explanation of the invention as claimed.

EFFECTS OF THE INVENTION

According to the present invention, a displacement measurement method and a displacement measurement device that have a simple configuration allowing for reduction in size, that are not affected by inclination accuracy of the diffraction grating or by a diffraction grating being off-positioned in a surface direction, and that enable an adjustment of the optical resolution can be provided. Also, measurement of displacements at different positions and different detection sensitivities can be performed simultaneously or chronologically with a single light source.

BRIEF DESCRIPTION OF THE DRAWINGS

FIG. 1(A) is a diagram showing a basic configuration. FIGS. 1(B-

1) and 1(B-2) are diagrams that show an optical path 1 and an optical path 2. FIGS. 1(C) and 1(D) are diagrams showing interference between the optical paths 1 and 2.

FIG. 9(A) is a diagram showing a basic configuration. FIG. 9(B) is a diagram showing a configuration of an optical detection circuit. FIG. 9(C) is a diagram showing a modification example.

FIG. 13(A) is a diagram showing a configuration of a displacement measurement unit. FIG. 13(B) is a diagram showing an example of attaching the displacement measurement unit to an electric assist bicycle. FIG. 13(C) is a diagram showing a part arrangement when the above-mentioned configuration in FIG. 13(B) is viewed from a side of an arrow F13.

DETAILED DESCRIPTION OF EMBODIMENTS

Preferred embodiments of the present invention will be explained in detail below with reference to examples.

Embodiment 1

Basic Configuration

Figure 1:
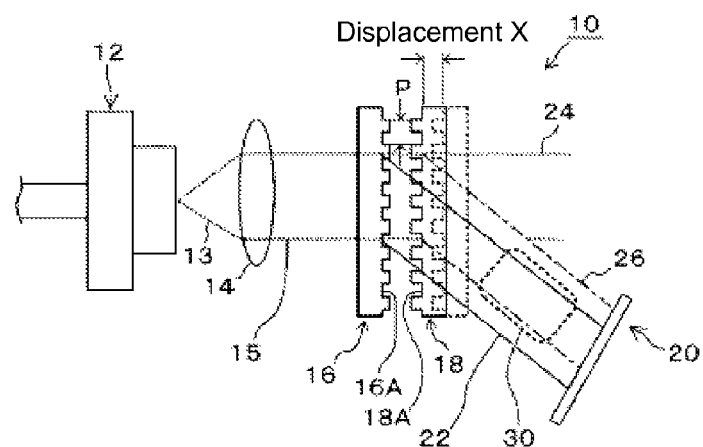
FIG. 1 shows Embodiment 1 of the present invention.
Figure 1:
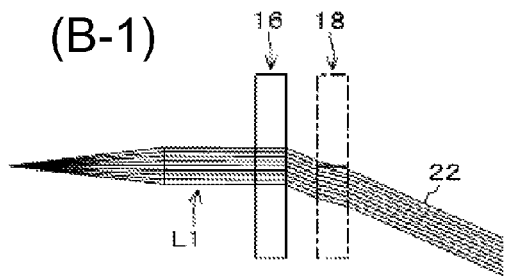
Figure 1:
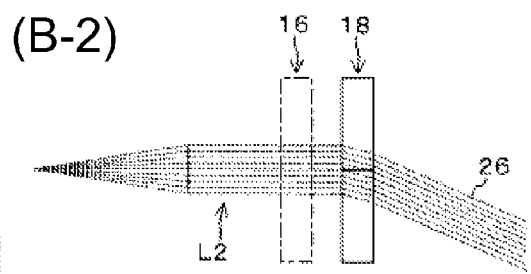
Figure 1:
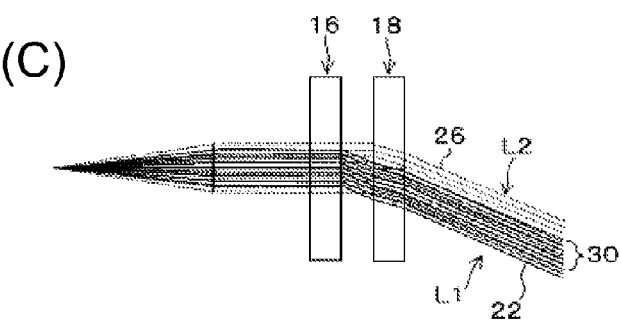
Figure 1:
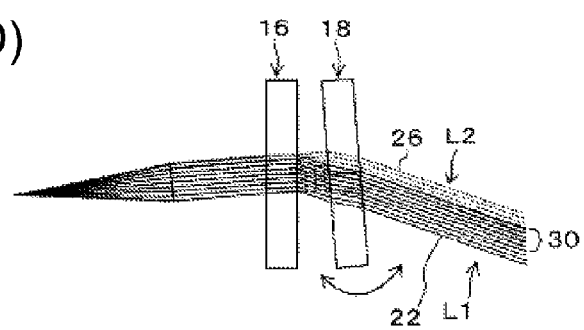

First, a basic configuration of the present invention will be explained with reference to FIG. 1. FIG. 1(A) is a diagram showing a basic configuration of this embodiment. FIGS. 1(B-1) and 1(B-2) are diagrams that respectively show an optical path 1 and an optical path 2. FIGS. 1(C) and 1(D) are diagrams showing interference between the optical paths 1 and 2. As shown in FIG. 1(A), a displacement measurement device 10 of this embodiment includes: a laser light source 12 such as a laser diode; a collimator lens 14 that turns a laser beam 13 from the laser light source 12 into parallel light 15 that travels straight; a first diffraction grating 16 on a stationary side; a second diffraction grating 18 on a moveable side that is disposed to so as to face and move relative to the first diffraction grating 16; and a first optical sensor 20 such as a photodiode. The parallel light 15 is divided into direct light 24 and diffracted light 22 when it passes through the first diffraction grating 16. The direct light 24 is further divided into the direct light 24 and diffracted light 26 when it passes through the second diffraction grating 18.

The parallel light 15 that has passed through the first diffraction grating 16 is divided, and travels as zeroth-order light that travels in the same direction as the parallel light 15, i.e., zeroth-order diffracted light, and ±nth-order light that has a diffraction angle relative to the zeroth-order light, i.e., ±nth-order diffracted light (n is a positive integer that is equal to or greater than 1) in reality. However, for convenience, zeroth-order light that travels in the same direction as the parallel light 15 after passing through the first diffraction grating 16 and the second diffraction grating 18 are collectively referred to as the direct light 24. The diffracted light 22 refers to light that becomes the positive first-order light after passing through the first diffraction grating 16 and that continues traveling in the same direction after passing through the second diffraction grating 18. Further, the diffracted light 26 is defined as part of the zeroth-order light that has passed through the first diffraction grating 16, which is the direct light 24, and that becomes the positive first-order light after passing through the second diffraction grating 18. Although this embodiment employs the positive first-order light, displacement measurement described below may also be conducted by using diffracted light of other prescribed orders. Further, not only the diffracted light shown in FIG. 1, but also many other kinds of diffracted light exist in reality, but they are not shown in the figure for ease of explanation below. Similarly, they are not shown in Embodiment 2 as well as other embodiments that follow.

The first diffraction grating 16 and the second diffraction grating 18 have a plurality of grooves 16A and 18A formed with the same prescribed pitch, which is a grating pitch P shown in FIG. 1(A), for example, so that the two diffraction gratings have the same diffraction direction. The first optical sensor 20 receives diffracted light travelling along the optical axis of the diffracted light 22 from the first diffraction grating 16, including the diffracted light 26 diffracted by the second diffraction grating 18, thereby detecting an amount of interference light 30. This way, the first optical sensor 20 is used to measure a displacement amount between the first diffraction grating 16 and the second diffraction grating 18 in the axis direction from an interference pattern that corresponds to an amount of movement or a displacement amount of the second diffraction grating 18, or a signal thereof. The term "axis direction" used in the present invention means a direction of the optical axis of the parallel light that is made parallel the light emitted from the light source by passing through the collimator lens.

FIG. 1(B-1) shows an optical path L1 being diffracted by the first diffraction grating 16. FIG. 1(B-2) shows an optical path L2 being diffracted by the second diffraction grating 18. The optical path L1 shown in FIG. 1(B-1) only illustrates the diffracted light 22 (zeroth-order light→positive first-order) that is part of diffracted light passing through the first diffraction grating 16, which is the positive first-order light in this embodiment, and that travels in the same direction even after passing through the second diffraction grating 18. The optical path L2 shown in FIG. 1(B-2) only illustrates the diffracted light 26 (zeroth-order light→positive first-order light) that is part of the light traveling straight after passing through the first diffraction grating 16 and that travels in the same direction as that of the diffracted light 22 shown in FIG. 1(B-1) after passing through the second diffraction grating 18. FIG. 1(C) shows the optical paths L1 and L2 that are overlapping each other. As described later, the present invention makes it possible to measure the displacement amount by measuring an amount of the interference light 30 before and after the second diffraction grating 18 is moved. As shown in FIG. 1(D), because the optical paths L1 and L2 are configured to travel on the same optical path, and further because the characteristic of the transmitted and diffracted light of the diffraction grating, which is being insensitive to the inclination of the diffraction grating, is utilized, even when the second diffraction grating 18 is tilted, that is, even when it vibrates due to the vibration effects or the like, the interference pattern is not adversely affected. Also, because the splitter, which is the largest element in the optical system described as the background art, can be eliminated, it becomes possible to reduce the device size as well as the cost.

Qualitative Operation Principle

Figure 2:
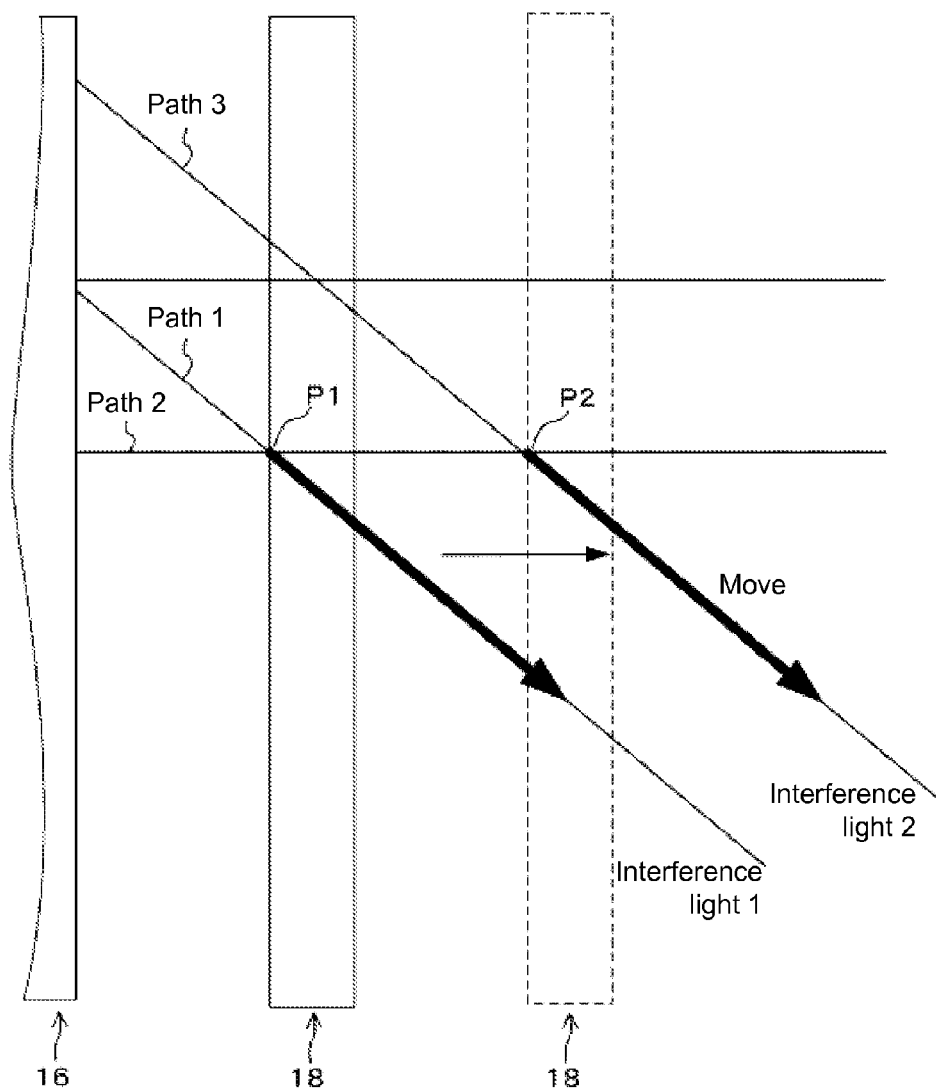
FIG. 2 is an explanatory diagram illustrating a qualitative operational principle of displacement measurement according to Embodiment 1 above.

Next, with reference to FIGS. 1(A) and 2, the qualitative operation principle of this embodiment will be explained. FIG. 2 is an explanatory diagram showing the qualitative operation principle of the displacement measurement of the present invention. First, the first diffraction grating 16 and the second diffraction grating 18 are placed so as to face each other with a prescribed spacing therebetween. A laser beam from the laser light source 12 is converted to the parallel light 15 by passing through the collimator lens 14, and enters the first diffraction grating 16. The incident light is divided into the diffracted light 22 diffracted by the first diffraction grating 16, which are a path 1 and a path 3, for example, and direct light, which is the direct light 24 in FIG. 1(A). Each light thereafter enters the second diffraction grating 18. The direct light is further diffracted by the second diffraction grating 18 (path 2), causing an interference between the diffracted light 22 of the stationary side and the diffracted light 26 of the moveable side, and an amount of this interference light is detected by the first optical sensor 20. When the second diffraction grating 18 is moved from a position indicated by the solid line to a position indicated by the broken line in the axis direction as shown in FIG. 2, the position where the diffracted light of the path 2 is diffracted on the optical axis is shifted from a position P1 to a position P2. Before the shift, interference light 1 that reflects a path difference in the interference between the diffracted light on the path 1 and the diffracted light on the path 2 is generated. After the shift, the diffracted light on the path 2 and the diffracted light on the path 3 interfere with each other, thereby generating interference light 2. That is, a path difference between the path 3 and the path 1 as shown in FIG. 2 is created due to the shift. The bright and dark lines in the interference pattern are repeated in accordance with the optical interference that corresponds to the amount of the movement, which makes it possible to detect the amount of movement.

Quantitative Operation Principle

Figure 3:
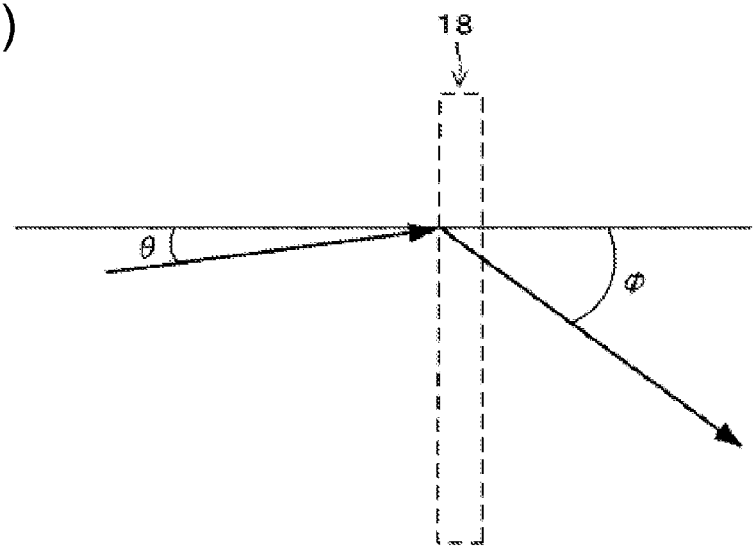
FIG. 3 is an explanatory diagram illustrating a quantitative operational principle of displacement measurement according to Embodiment 1 above.
Figure 3:
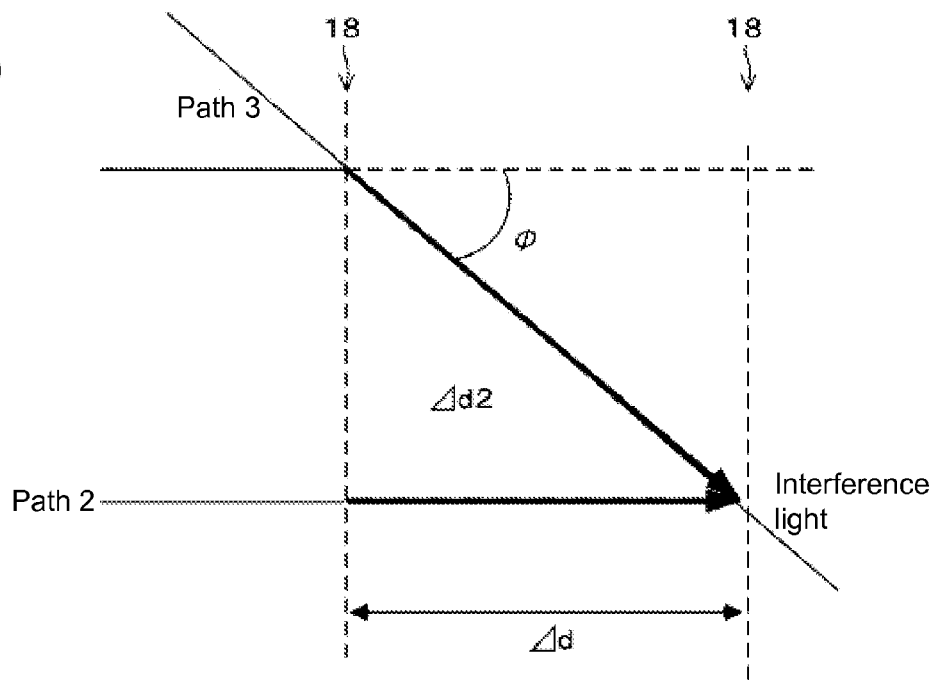

Next, a quantitative operation principle of this embodiment will be explained with reference to FIG. 3. FIG. 3 is a diagram showing the quantitative operation principle of the displacement measurement of the present invention. As shown in FIG. 3(A), in a transmissive diffraction grating, that is, in an example shown in the figure, a relationship between an incident angle θ and a diffraction angle φ of the second diffraction grating 18 can be represented by Formula 1 below for the first-order diffraction light, where the incident angle θ is zero degree, λ is a wavelength, and P is a diffraction grating pitch, for example.

$$\sin \phi + \sin \theta = \lambda / P \qquad \text{Formula 1}$$

On the other hand, as shown in FIG. 3(B), when the second diffraction grating 18 is moved by Δd, the path length of the path 2 is changed by Δd, and the path length Δd2 of the path 3 is represented by Formula 2 below.

$$\Delta d2 = (\Delta d / \cos(\phi)) \qquad \text{Formula 2}$$

If there is no path difference between the path 2 of the moveable side and the path 1 of the stationary side before the movement, a path difference Δ after the movement is represented by Formula 3 below.

$$\Delta = \Delta d2 - \Delta d \qquad \text{Formula 3}$$
$$= \Delta d (1/\cos(\varphi) - 1)$$

A specific example based on the above-mentioned quantitative operation principle will be explained below. When the incident angle θ is 0, the wavelength λ is 0.65 μm, and the grating pitch P is 1.6 μm, from Formula 1 above, the diffraction angle φ is represented as follows:

Diffraction angle φ=ARCSIN(0.65/1.6)=24.0°

Because the diffraction angle φ when the diffraction grating is used becomes 24 degrees, the path difference Δ between the path 2 and the path 3 with respect to the amount of movement Δd is represented as follows from Formula 3 above:

Δ=Δd(1/cos(24°)−1)=0.094Δd

Thus, one pair of light and dark lines of the interference pattern appears for the movement of about 11 wavelengths.

In the above-mentioned interferometer of the background art, the amount of movement for one wavelength always produces an interference pattern of two bright lines and two dark lines. However, in this embodiment, the occurrence frequency of the interference pattern depends on the diffraction angle φ, and therefore, the detection range can be expanded by the diffraction angle φ. Also, because the diffraction angle φ is determined by the grating pitch P and the wavelength, it can be said that the occurrence frequency of the interference pattern depends on the grating pitch P. By making the grating pitches P of the first diffraction grating 16 and the second diffraction grating 18 smaller, it becomes possible to detect a displacement amount on the order of one wavelength or smaller. As described, by expanding the detection range, a linear portion can be detected, and therefore, the displacement detection in a wide range from a domain smaller than 1 μm to tens of millimeters becomes possible.

Table 1 below shows a relationship among the number of grating lines (lines/mm), the grating pitch P (μm), the diffraction angle ϕ (degree), the magnification G (magnification), and the detection range (μm) of the first and second diffraction gratings 16 and 18 as an example. If the path difference caused by the movement Δd of the second diffraction grating 18 is defined as Δ, Δ is represented by Formula 3 above. The magnification G is represented by Δd/Δ. When G equals 1, the detection range is one optical wavelength with a waveform of the sine wave. When G becomes greater, the detection range is represented by "wavelength λ×magnification G", and due to the sine wave magnification, the linear detection can be achieved.

TABLE 1

|  | μm sensor |  |  | mm sensor |  |
| --- | --- | --- | --- | --- | --- |
| Number of lines (lines/mm) | 1350 | 625 | 300 | 20.511 | 10 |
| Grating pitch P (μm) | 0.74 | 1.60 | 3.33 | 48.75 | 100.00 |
| Diffraction angle ϕ (degrees) | 61.34224 | 23.96948 | 11.24472 | 0.763898 | 0.372425 |
| Magnification (magnification) G | 0.921513 | 10.59581 | 51.09213 | 11250.5 | 47335.78 |
| Detection range (μm) | 0.299492 | 3.443639 | 16.60494 | 3656.412 | 15384.13 |

Application Example

Figure 4:
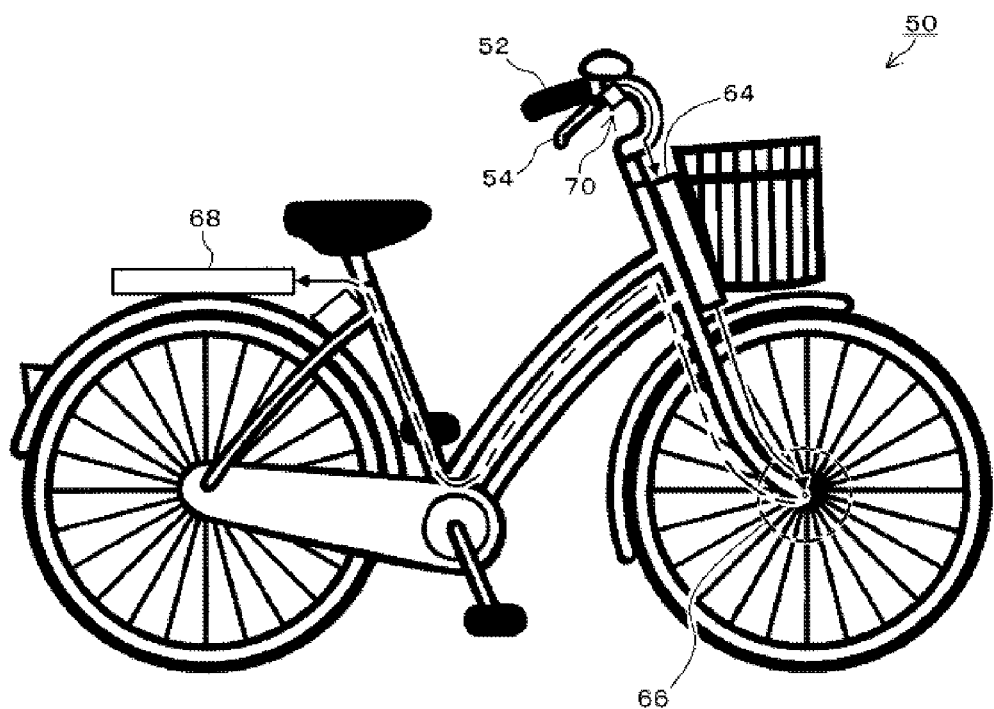
FIG. 4 is a diagram showing an application example of Embodiment 1 above. The figure shows an overall configuration of an electric assist bicycle that employs a displacement measurement device of Embodiment 1.
Figure 5:
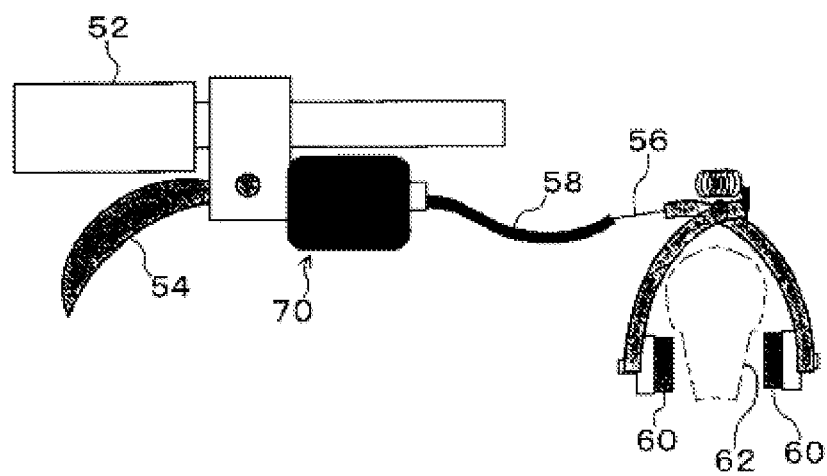
FIG. 5 is a schematic view showing a brake mechanism of the electric assist bicycle of the application example.
Figure 5:
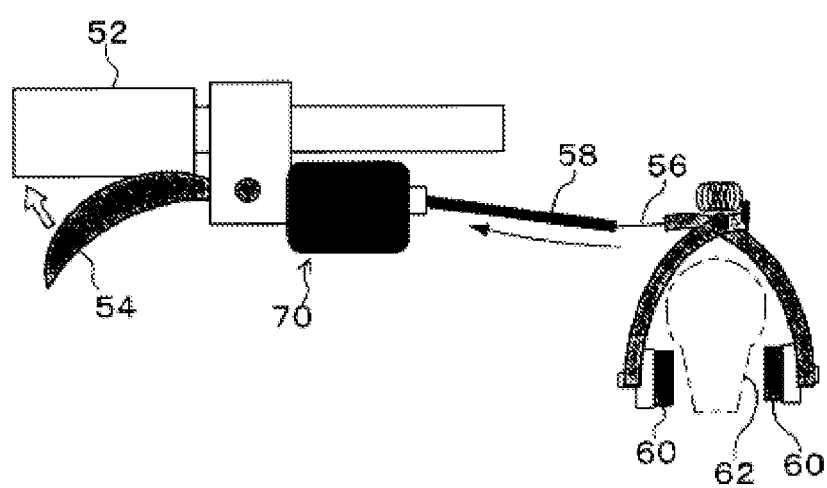
Figure 5:
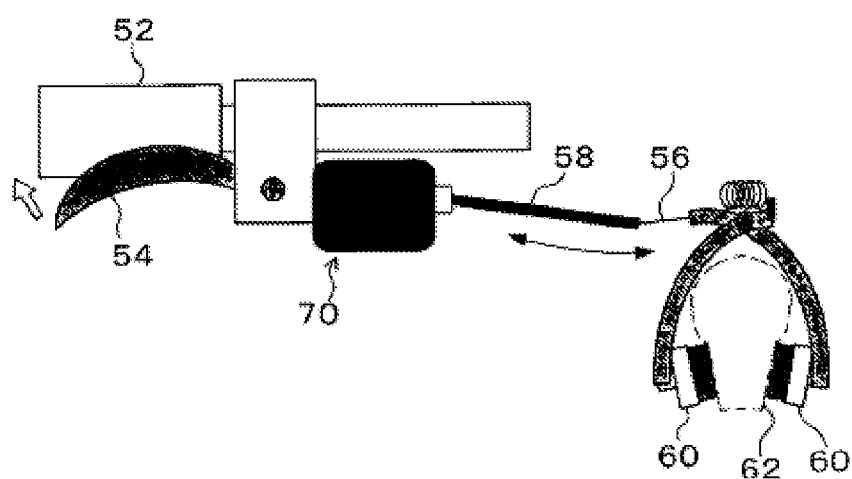
Figure 6:
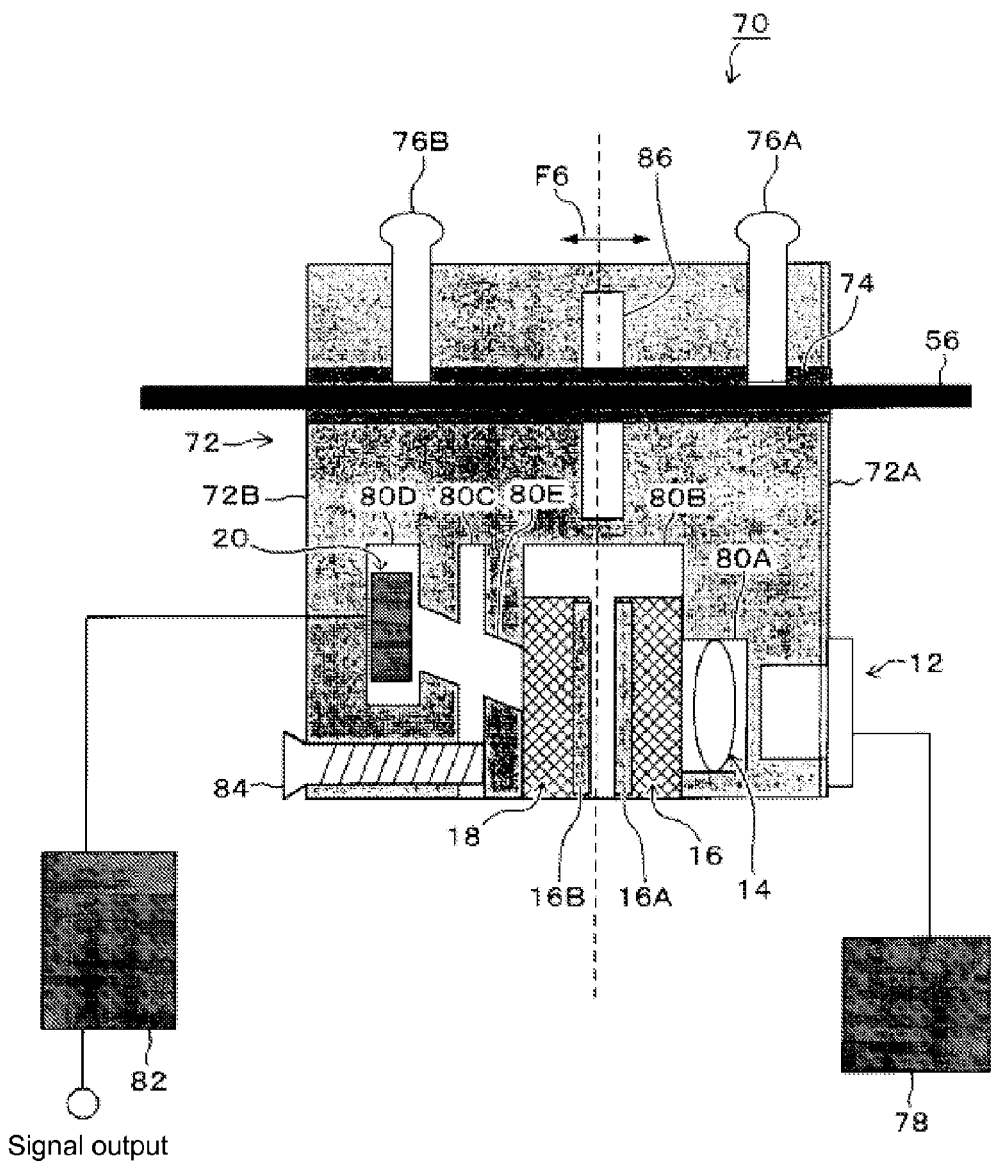
FIG. 6 is a diagram showing a configuration example of a displacement measurement unit in the application example.
Figure 7:
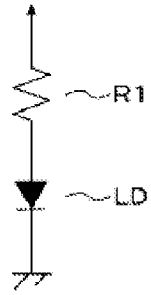
FIG. 7(A) is a diagram showing a circuit configuration of a laser light source in the application example.
FIG. 7(B) is a diagram showing a configuration of an optical detection circuit in the application example.
FIG. 7(C) is a diagram showing a signal waveform of an output 1 from the optical detection circuit.
FIG. 7(D) is a diagram showing measured characteristics of the displacement measurement unit in the application example.
FIG. 7(E) is a diagram showing results of an optical simulation.
Figure 7:
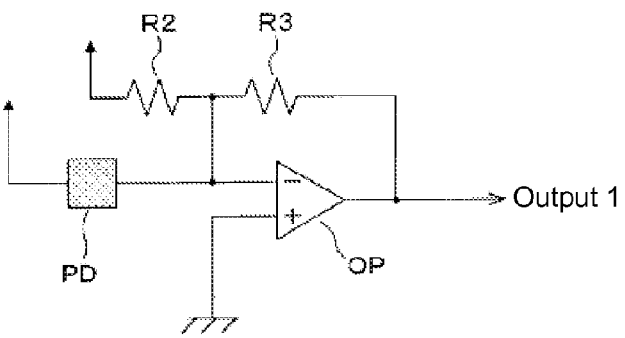
Figure 7:
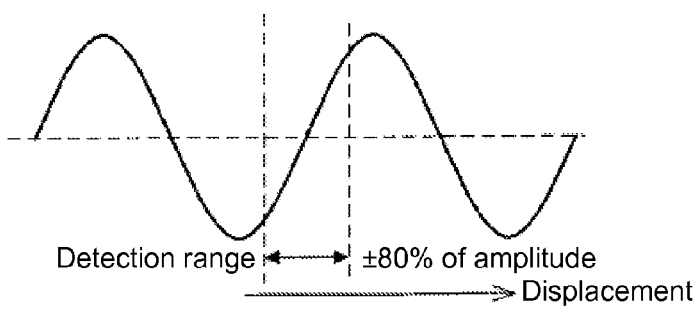
Figure 7:
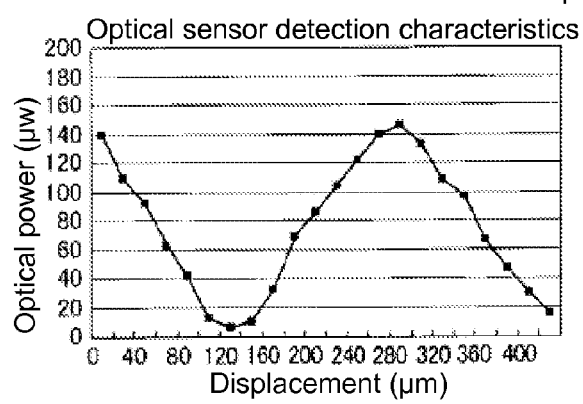
Figure 7:
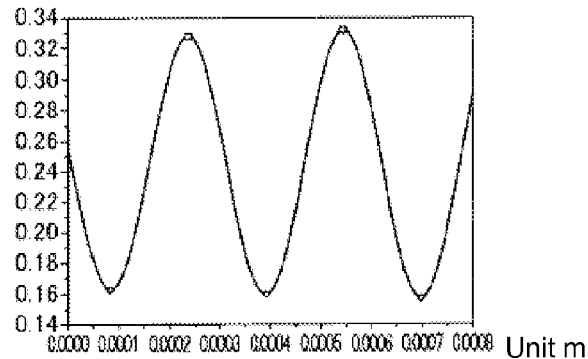
Figure 8:
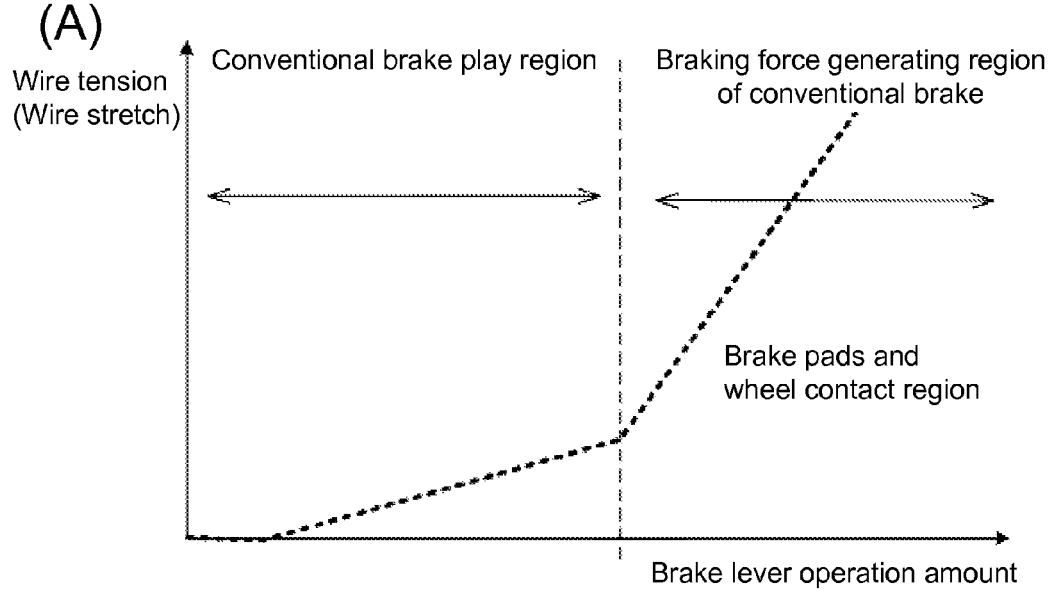
FIG. 8(A) is a diagram showing a relationship between a brake lever operation amount and a wire tension.
FIG. 8(B) is a diagram showing a relationship between a brake lever operation amount and a braking force.
Figure 8:
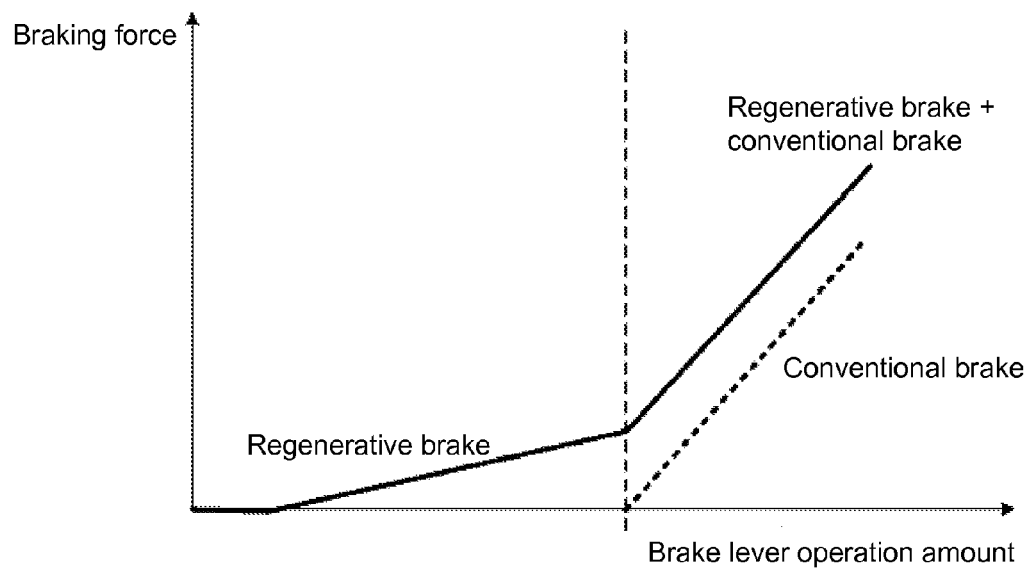

Next, an application example where the displacement measurement device 10 of this embodiment is used to measure a stretched amount of a brake wire of an electric assist bicycle will be explained with reference to FIGS. 4 to 8. FIG. 4 is a diagram showing an overall configuration of an electric assist bicycle. FIG. 5 is a diagram schematically showing a brake mechanism of the electric assist bicycle. FIG. 6 is a diagram showing a configuration example of a displacement measurement unit that is provided in the electric assist bicycle. FIG. 7(A) is a diagram showing a circuit configuration of a laser light source. FIG. 7(B) is a diagram showing a configuration of an optical detection circuit. FIG. 7(C) is a diagram showing a signal waveform of an output 1 from the optical detection circuit. FIG. 7(D) is a diagram showing measured characteristics of the displacement measurement unit of the displacement measurement unit. FIG. 8 shows relationships of a brake lever operation amount with a wire tension and with a braking force. As shown in FIGS. 4 and 5, an electric assist bicycle 50 is equipped with a brake mechanism including a handle 52, a brake lever 54, a brake wire 56 covered by a tube 58, brake pads 60, and the like, a controller 64, a motor 66, a battery 68, a displacement measurement unit 70, and the like.

As shown in FIG. 5, the above-mentioned brake mechanism has a known configuration where a user operates the brake lever 54 to apply tension to the brake wire 56 so that the brake pads 60 are pressed against the rim 62. In a play stage where the user starts squeezing the brake lever 54 (i.e., before the brake pads 60 engage the rim 62), the brake wire 56 is moved as shown in FIG. 5(B). When the brake pads 60 are in contact with the rim 62, and a braking force by the mechanical brake is therefore applied, the brake wire 56 is stretched as shown in FIG. 5(C). In this embodiment, an explanation will be made for a case where a brake operating force is measured by detecting the stretched amount of the brake wire 56 shown in FIG. 5(C) with the displacement measurement unit 70.

As shown in FIG. 6, in the displacement measurement unit 70, the brake wire 56 is provided so as to run through a through-hole 74 formed in the upper side of a transparent resin molded body 72, and the brake wire 56 are secured by screws 76A and 76B at two positions that are respectively close to side surfaces 72A and 72B of the transparent resin molded body 72. The laser light source 12 is provided so as to be fitted in a not-shown circular recessed space formed on a side of the side surface 72A. The laser light source 12 is connected to a laser driver circuit 78. Further, the collimator lens 14 is arranged in a space or a slit 80A that is formed so as to penetrate the transparent resin molded body 72 in thereof. The first diffraction grating 16 and the second diffraction grating 18 are arranged in a space 80B that penetrates in the thickness direction, and are secured by a transparent adhesive and the like applied to the respective rear surfaces thereof. Further, the first optical sensor 20 is arranged in a space 80D penetrating in the thickness direction. An UV conversion circuit 82 is connected to the first optical sensor 20.

Between the spaces 80B and 80D, another space 80C is provided. By disposing a screw 84 that penetrates from a side of the other side surface 72B of the transparent resin molded body 72 through the space 80C, the side surface of the space 80C can be pushed, thereby allowing for an adjustment of an initial position of the second diffraction grating 18. The transparent resin molded body 72 is also provided with a space 80E that connects the spaces 80B and 80D so as to provide a passage for diffracted light, and a slit 86 that penetrates in the thickness direction above the space 80B. This slit 86 is used to provide the transparent resin molded body 72 with a spring characteristic so that the transparent resin molded body 72 expands and shrinks in the axis direction (see the arrow F6 in FIG. 6) together with the brake wire 56 between the first diffraction grating 16 and the second diffraction grating 18 while keeping these diffraction gratings 16 and 18 parallel. The transparent resin molded body 72 has no warp in the thickness direction.

As the transparent resin molded body 72, a 15 mm square and about 5 mm thick molded body made of a transparent resin such as acryl or polycarbonate was used, for example. As the laser light source 12, a laser diode LD with the wavelength of 650 nm and the output of 5 mW was used. The optical axis thereof was set so that a plane of the smallest emergence angle becomes parallel with the grooves 16A and 18A of the diffraction gratings and the width of 1.5 mm was used. As the first diffraction grating 16 and the second diffraction grating 18, the gratings with the grating pitch P of 1.6 μm, the depth of the grooves 16A and 18A of 150 nm, and the groove width of 0.5 μm were respectively used. The diffraction direction of the first diffraction grating 16 and the second diffraction grating 18 is set so as to be the same, and the distance between the two diffraction gratings is set so as to be within a coherence length of the laser light source 12, which is about 1 mm, for example. This is because if the distance between the two diffraction gratings 16 and 18 is made greater, it worsens the optical interference property, thereby making the bright and dark lines of the interference pattern difficult to distinguish. Further, as another factor, if the distance is made greater, two beams to be interfered become further apart from each other, making the overlapping area smaller, and therefore, it becomes necessary to maintain an optical beam diameter within a certain size range.

The displacement measurement unit 70 configured in the above-mentioned manner has the following structure so as to detect the stretch of the brake wire 56: when the transparent resin molded body 72 is divided into two portions at a line between the first diffraction grating 16 and the second diffraction grating 18, which is the broken line portion shown in FIG. 6, the respective portions are secured to the brake wire 56 by the screws 76A and 76B, respectively, and the separated two portions are joined together around the slit 86. This configuration provides the spring characteristic that allows, when the brake wire 56 is stretched, the distance between the two diffraction gratings 16 and 18 to change in accordance with the stretch of the brake wire 56 while keeping the diffraction gratings parallel with each other so that the stretched amount can be detected.

FIG. 7(A) shows a circuit configuration of the laser light source 12. In this embodiment, the laser diode LD is used as the laser light source 12, and the laser diode LD is connected to a power source through a current limiting resistor R1. On the other hand, FIG. 7(B) shows an optical detection circuit of this embodiment. In this embodiment, a photodiode PD is used as the first optical sensor 20. In the photodiode PD, a current is generated in accordance with an amount of interference light that has been received, and the current is input into the negative input terminal of an operational amplifier OP so as to be converted to a voltage, which is thereafter output as the output 1. That is, this operational amplifier OP corresponds to the I/V conversion circuit 82. The circuit shown in FIG. 7(B) includes two resistors R2 and R3. The resistor R2 defines an output actuation point of the operational amplifier OP, which is an output voltage when an optical signal is zero. The resistor R3 has both ends thereof connected to the operational amplifier OP, and defines gain of an output voltage relative to an amount of light incident to the first optical sensor 20, which is the photodiode PD, for example. As the resistor becomes greater, the greater voltage is output from the same light amount.

FIG. 7(C) shows a waveform of the output 1 from the operational amplifier OP. In the figure, the horizontal axis indicates a displacement X, and the vertical axis indicates a detection voltage. As shown in the figure, in the detection method of this embodiment, the detection characteristic can be represented by sin X, which allows the displacement X to be obtained from the intensity of the electrical signal. Although the sine wave of the detection characteristic shown in FIG. 7(C) can be used up to 100% of the amplitude thereof, taking into account variations in the detection range caused by variations in adjustment of a home position of the optical sensor 20, it is more preferable to use a range of about ±80% of the amplitude so as to allow a 20% margin. FIG. 7(D) shows measured characteristics of the actual displacement measurement unit. FIG. 7(E) shows results of an optical simulation of the actual displacement measurement unit. The measurement results shown in FIG. 7(D) are the detection results of optical power when the diffraction grating 18 is moved from a stationary position on the axis so as to be further away from the diffraction grating 16. The grating pitch P of the diffraction gratings 16 and 18 used in this measurement was 10 μm. One detection cycle for the displacement shown in the simulation results of FIG. 7(E) was 307 μm, and the value thereof obtained by the actual measurement was about 300 μm, which confirms that the actual operation coincides with the theory.

The displacement measurement unit 70 is disposed near the brake lever 54, and detects a stretch, i.e., a displacement, of the brake wire 56 caused by the operation of the brake lever 54. The controller 64 determines an optimal regenerative braking force in accordance with the output from the displacement measurement unit 70, and controls the motor 66 so that the optimal regenerative braking control is provided. This makes the motor 66 function as a generator, and the battery 68 is charged with the generated electricity. The controller 64 also monitors the battery performance and status of the battery 68. In the electric assist bicycle 50 equipped with such a displacement measurement unit 70, a very small deformation of the brake wire 56 due to tension can be detected by the displacement measurement unit 70, and therefore, it is possible to activate the regenerative brake that uses the motor 66 as a generator to charge the battery 68 in a conventional brake play stage (i.e., before the manual brake is engaged) shown in FIG. 8(A) (see FIG. 8(B)). Further, as shown in FIG. 8(B), even when the mechanical brake is applied, in other words, in a region where the brake pads make contact with the wheel, the regenerative brake is concurrently applied. This makes it possible to increase the utilization efficiency.

As described above, according to Embodiment 1, the parallel light 15 from the laser light source 12 that has passed through the collimator lens 14 is divided by the first diffraction grating 16 on the stationary side, and continues travelling as direct light and diffracted light. The respective light rays thereafter pass through the second diffraction grating 18 on a movable side that faces the first diffraction grating 16. The first optical sensor 20 receives diffracted light travelling along the optical axis of the diffracted light of a prescribed order from the first diffraction grating 16, including the diffracted light diffracted by the second diffraction grating 18, and detects the amount of the light. This makes it possible to measure the displacement amount in the axis direction from the interference pattern or the signal thereof, which corresponds to the amount of movement of the second diffraction grating 18, and therefore, the following effects are obtained:

(1) By using the same optical path, the tilt effects are cancelled, and therefore, it becomes possible to prevent an erroneous detection caused by disturbance such as vibrations.

(2) By eliminating the need for a splitter, the number of components can be reduced, thereby achieving the reduction in size and the lower cost. Also, because the configuration is simple, it is not easily affected by positional misalignment.

(3) The measuring range can be expanded beyond one wavelength. The displacement equal to or smaller than one wavelength to the displacement equal to or greater than one wavelength can be measured continuously. Also, the optical resolution can be adjusted by the pitch of the diffraction grating.

(4) By using the displacement measurement device 10 of this embodiment as the displacement measurement unit 70 for measuring the stretched amount of the brake wire 56 of the electric assist bicycle 50, it becomes possible to activate the regenerative brake that uses the motor 66 as a generator to charge the battery 68, even in the play stage (i.e., before the manual brake is engaged) of the conventional brake.

Embodiment 2

Figure 9:
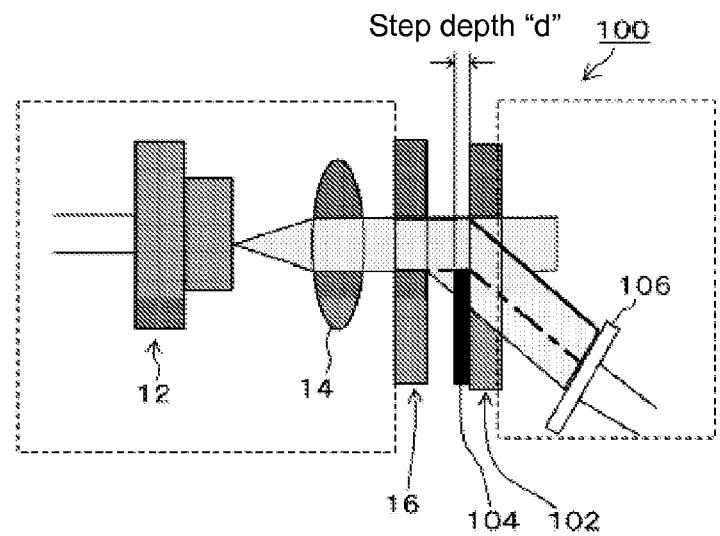
FIG. 9 shows Embodiment 2 of the present invention.
Figure 9:
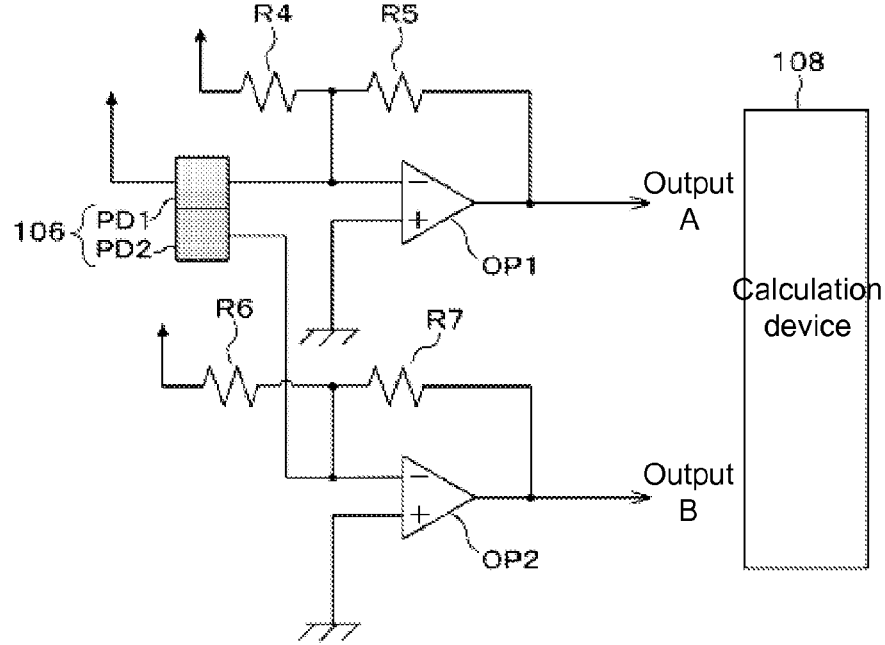
Figure 9:
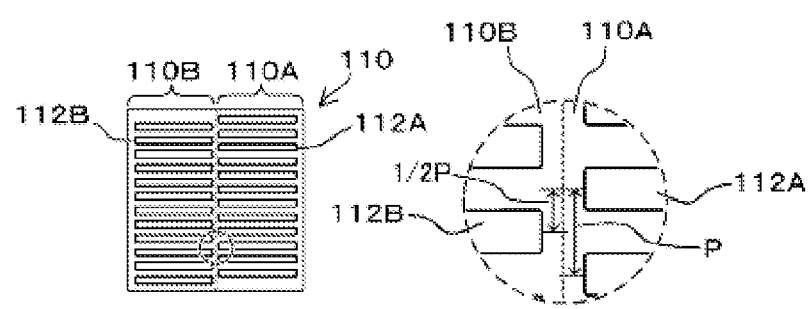
Figure 10:
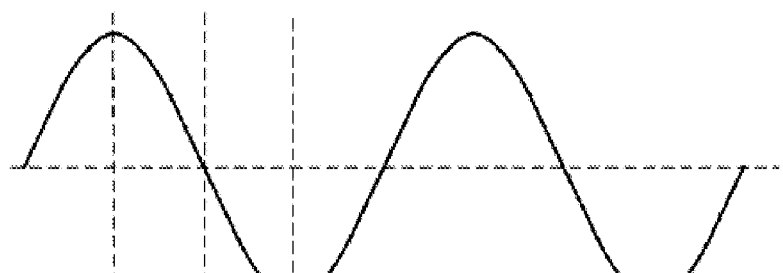
FIGS. 10(A) and 10(B) are diagrams showing signal waveforms of outputs A and B from the optical detection circuit of Embodiment 2 above.
FIG. 10(C) shows a signal waveform illustrating calculation results of the outputs A and B.
Figure 10:
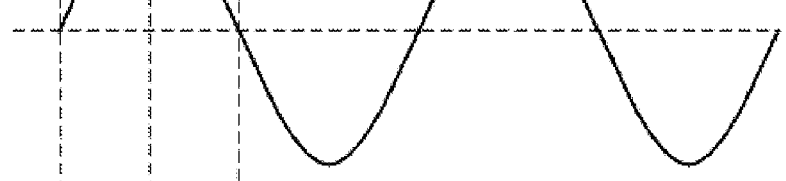
Figure 10:
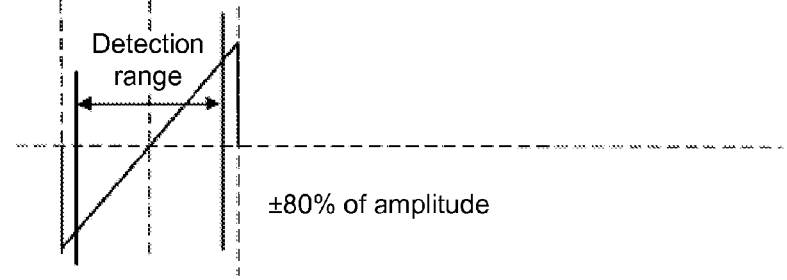

Next, Embodiment 2 of the present invention will be explained with reference to FIGS. 9 and 10. The same reference characters will be given to constituting elements that are the same as or corresponding to those in Embodiment 1 above (the same applies to other Embodiments that follow). FIG. 9(A) is a diagram showing a basic configuration of a displacement measurement device of this embodiment. FIG. 9(B) is a diagram showing a configuration of an optical detection circuit. FIG. 9(C) is a diagram showing a modification example of this embodiment. FIGS. 10(A) and 10(B) are diagrams showing signal waveforms of outputs A and B from the optical detection circuit. FIG. 10(C) is a signal waveform that indicates calculation results of the outputs A and B. This embodiment is an example of detecting phase difference by providing two optical areas with a phase difference. First, FIGS. 9(A) and 9(B) show an example of a case in which a step is provided to a diffraction grating on the moveable side so as to perform a division operation on outputs of a dual element optical sensor. With this configuration, a detection position is not changed even when a light amount of a laser light source is changed, and linear detection characteristics can be obtained instead of sine wave-shaped characteristics.

As shown in FIG. 9(A), in a displacement measurement device 100, a step is provided to a second diffraction grating 102 on the moveable side by disposing a phase plate 104 so as to cover nearly the entire lower half thereof. Also, a dual-element optical sensor 106 is used instead of the first optical sensor 20. Except for these differences, the configuration of the displacement measurement device 100 is same as that of Embodiment 1 above. The phase plate 104 is formed on one surface of a substrate in the thickness "d" such as about 3 μm, for example. The phase plate 104 is made of the same material as that of the second diffraction grating 102 in a unified manner by a method of cutting the step, die molding, or the like. Direct light emitted from the laser light source 12 becomes parallel light by passing through the collimator lens 14, and is divided into diffracted light and direct light by the first diffracting grating 16 on the stationary side. Further, the direct light enters the second diffraction grating 102 on the moveable side, and is diffracted at a portion of the surface thereof where the phase plate 104 is not provided (thick line in FIG. 9(A)). In a portion where the phase plate 104 is provided, the direct light passes through the phase plate 104, and is diffracted at the surface of the second diffraction grating 102 (chain line in FIG. 9(A)). As the dual-element optical sensor 106 in this embodiment, a dual-element photodiode including two photodiodes PD1 and PD2 is used as shown in FIG. 9(B).

When the two phase-shift method is used, two interference patterns with a path difference A of $\lambda/4*(1/\cos(\phi)-1)$ are produced, and these interference patterns are converted to a displacement through calculation. In this case, the step depth "d" can be represented by Formula 4 below, where "In" is the refraction index of the substrate.

$$d=\lambda/(1/\cos(\phi)-1)*(In-1)$$  Formula 4

If the wavelength λ is substituted with 0.65 μm, and the substrate refractive index In is substituted with 1.58 in Formula 4 above, for example, the depth of the step "d" can be determined as follows:

$$d = \lambda/(1/\cos(\varphi) - 1)/(In - 1)/4$$
$$= 0.65/0.094/(1.58 - 1)*1/4 \rightarrow 2.98 \; \mu m$$

The thickness (step depth "d") of the phase plate 104 is determined in the manner described above. Light rays, after passing through the second diffraction grating 102 that has the phase plate 104, enter the dual-element optical sensor 106, respectively. As shown in FIG. 9(B), a current is generated according to an amount of the interference light that has been received by the photodiode PD1, which is one of the photodiodes in the dual-element optical sensor 106. The current is thereafter input to the negative input terminal of an operational amplifier OP1, and is converted to a voltage, which is output as an output signal A. The output signal A is output from the operational amplifier OP1 as a sine wave as shown in FIG. 10(A). A resistor R5 is connected in parallel to both ends of the operational amplifier OP1. A resistor R4 is connected in series to the resistor R5 and the operational amplifier OP1. When the other photodiode PD2 receives the interference light, a current that corresponds to the light amount is generated. The current is input into the negative input terminal of the operational amplifier OP2, and is output as an output signal B after being converted to a voltage. The output signal B is output as a sine wave that is 90-degree out of phase from the output signal A with respect to a displacement X, which means that the output signal B is a cosine wave as shown in FIG. 10(B). Resistors R6 and R7 are connected to the operational amplifier OP2. Functions of the resistors R4 to R7 are the same as those of the resistors R2 and R3 of Embodiment 1 above.

The division process of the two output signals A and B result in Tan X, and therefore, a displacement X can be obtained by calculating A TAN, i.e. Tan$^{-1}$, of the quotient of the two signals as shown in the following Formula 5.

$$\tan^{-1}(A/B)$$  Formula 5

Such a calculation is performed by inputting the output signals A and B into a calculation device 108 shown in FIG. 9(B) and by digitalizing them by AD conversion or the like. FIG. 10(C) shows the results. In a manner similar to the detection method in Embodiment 1, in this case as well, it is more convenient if ±80% of the amplitude is used as the detection range. As described, according to Embodiment 2, the step with the depth "d" is provided to the second diffraction grating 102 on the moveable side by the phase plate 104, and the interference light is received by the dual-element optical sensor 106. This makes it possible to achieve linear characteristics by utilizing the phase shift.

Next, a modification example of this embodiment will be explained with reference to FIG. 9(C). As shown in FIGS. 9(A) and 9(B), the configuration where the phase plate 104 is provided to the second diffraction grating 102 so as to make a step is an effective technique when detection characteristics on the order of μm is to be achieved. However, in order to make a sensor that has a detection range of 20 mm, the step depth "d" provided by the phase plate 104 needs to be about 8.7 mm, and it becomes difficult to fabricate the sensor. To address this issue, in an example shown in FIG. 9(C), a pattern of a second diffraction grating 110 is offset so as to provide a phase difference only for ±nth-order diffracted light that has passed through the diffraction grating and to have no effects on zeroth-order light. The second diffraction grating 110 includes an area 110A that has a grating pattern made of a plurality of grating slits 112A, and an area 110B that has a grating pattern made of a plurality of grating slits 112B. The grating pattern of the area 110A and the grating pattern of the area 110B are offset from each other entirely by one-half or one-quarter of a grating pitch P. An example shown in FIG. 9(C) illustrates an offset of one-half of the pitch. The above-mentioned one-quarter offset is the same as a three-quarter offset with a different offset, and therefore, a grating pattern having the areas offset by an amount corresponding to the three-quarter of the grating pitch P may also be used. The grating slits 112A in the area 110A and the grating slits 112B in the area 110B have the same grating pitch P. Except for the above-mentioned second diffraction grating 110, constituting elements of the displacement measurement device are the same as those of the displacement measurement device 100 shown in FIG. 9(A). By employing the second diffraction grating 110, it is possible to obtain a 180-degree or 90-degree phase difference between light rays that have respectively passed through the two areas 110A and 110B having the offset grating patterns, resulting in the effect similar to the case shown in FIG. 9(A) where the step is provided.

Embodiment 3

Figure 11:
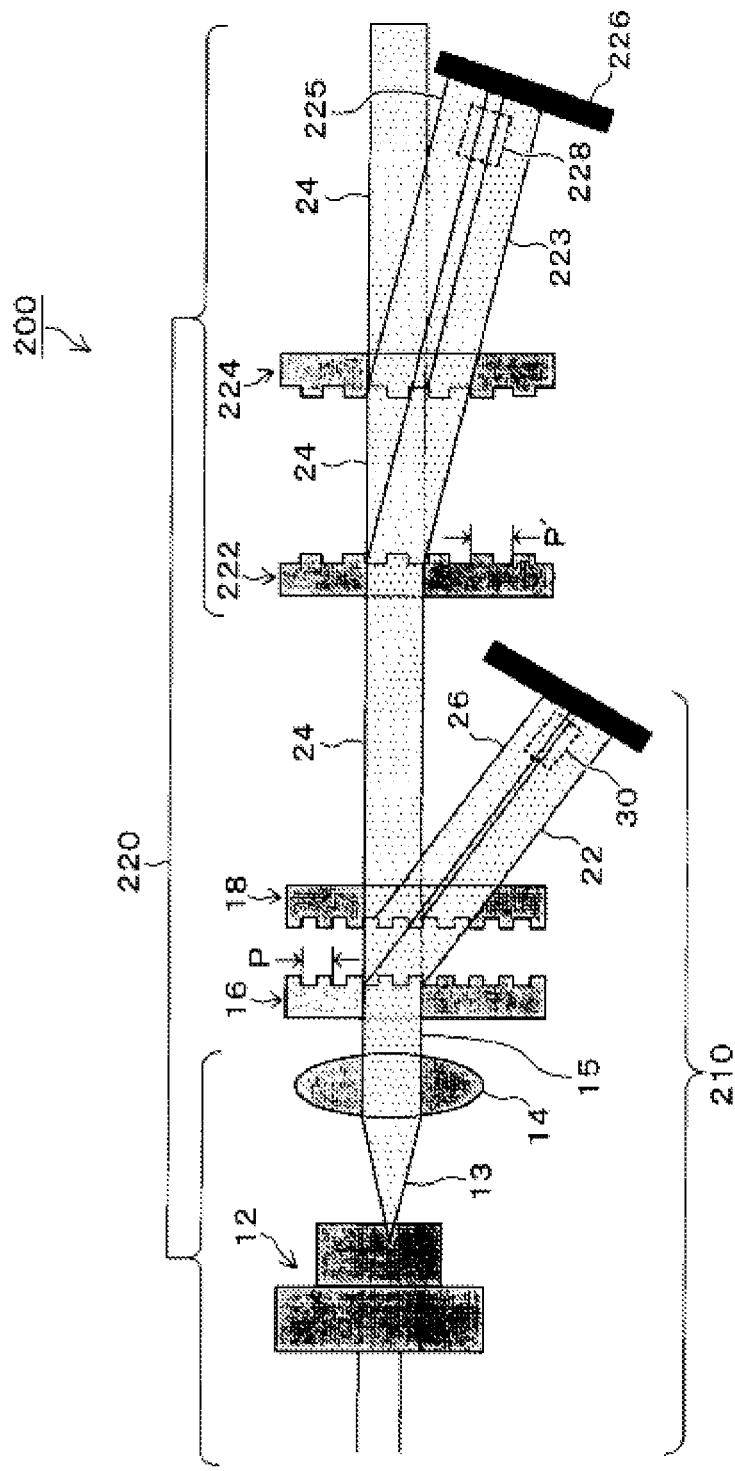
FIG. 11 is a diagram showing a basic configuration of Embodiment 3 of the present invention.
Figure 12:
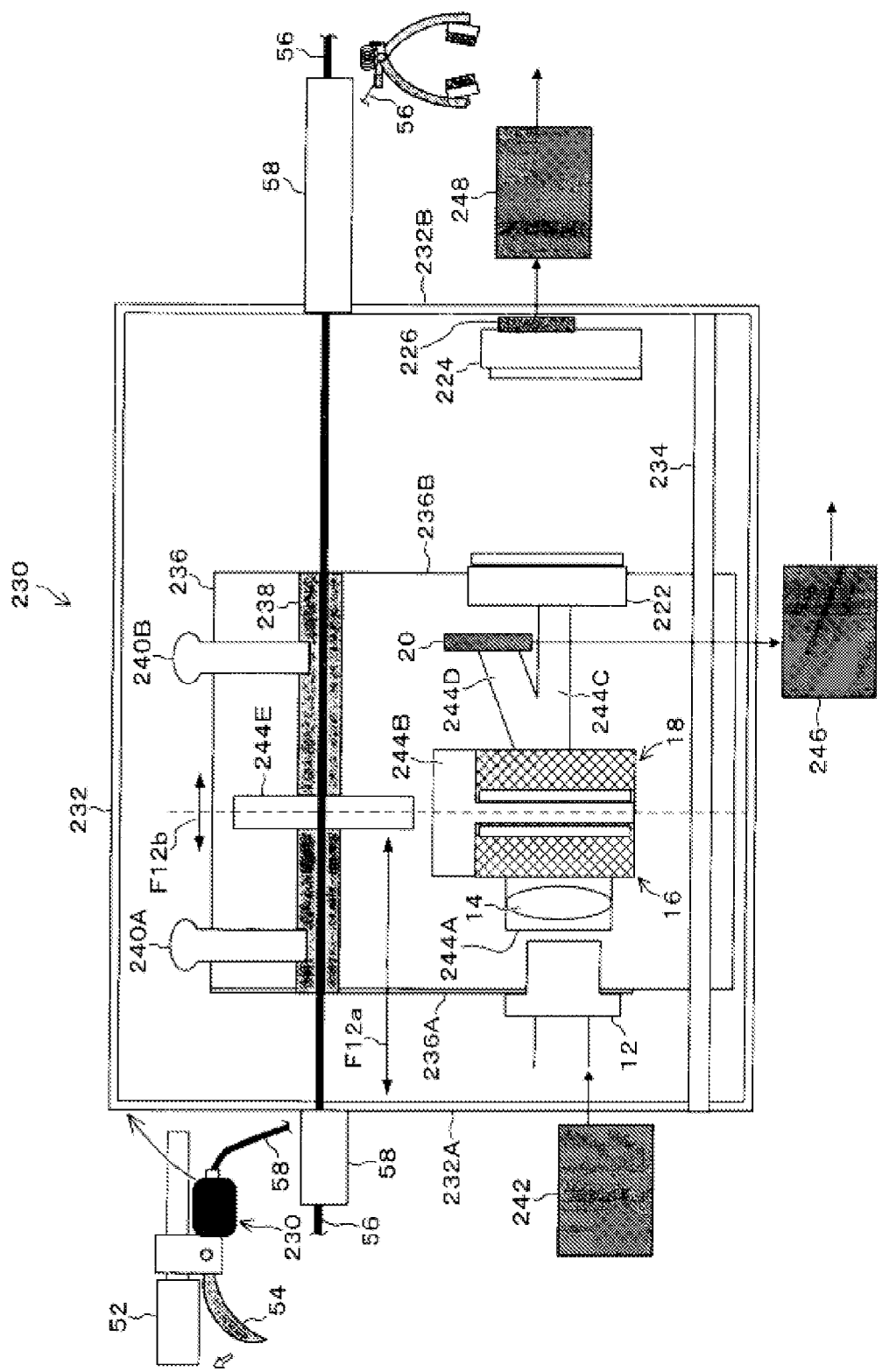
FIG. 12 is a diagram showing a configuration example of a displacement measurement unit in an application example of Embodiment 3 above.
Figure 17:
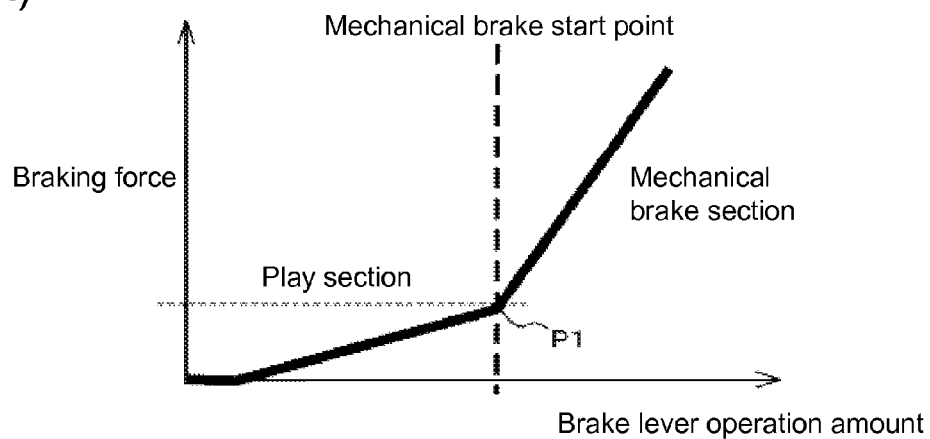
FIG. 17(A) is a diagram showing a relationship between a brake lever operation amount and a braking force in an electric assist vehicle.
FIG. 17(B) is an explanatory diagram showing a case where a brake actuation point has been changed in a relationship between a brake lever operation amount and a braking force.
Figure 17:
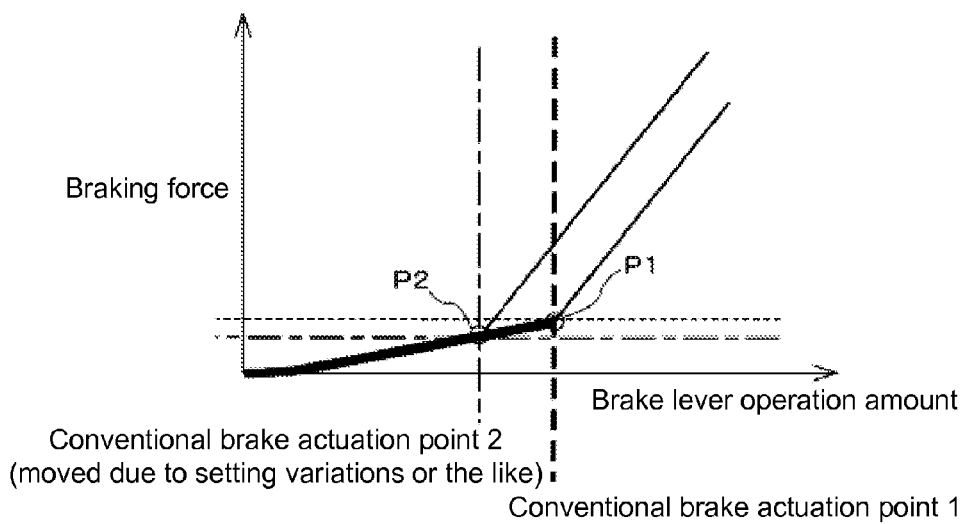
Figure 18:
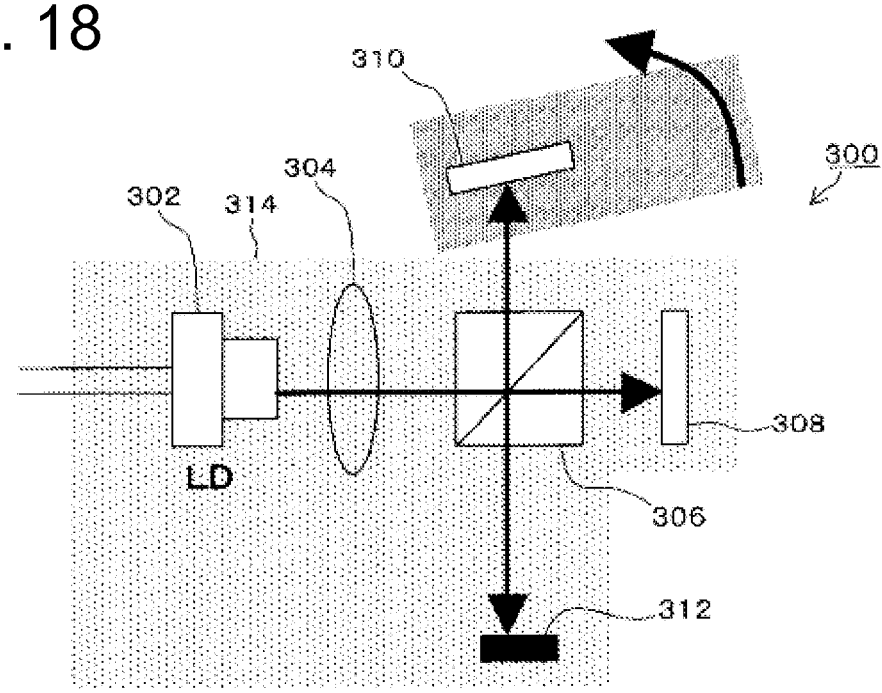
FIG. 18 is a diagram showing an example of background art.
Figure 18:
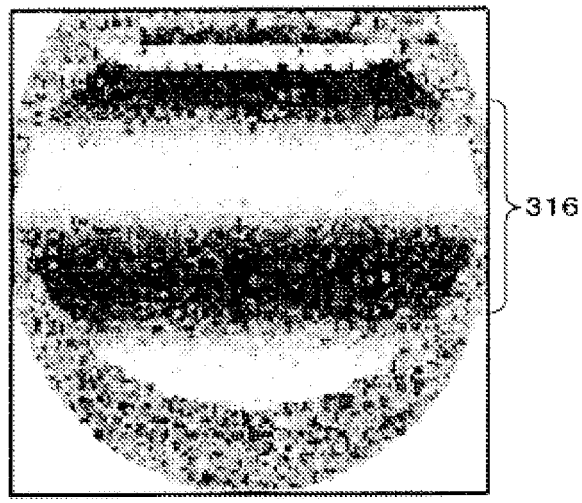
Figure 18:
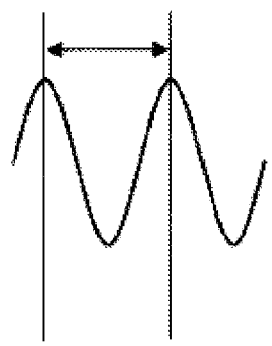

Next, Embodiment 3 of the present invention will be explained with reference to FIGS. 11 and 12. In Embodiment 1 above, the present invention is used to measure the stretched amount of the brake wire 56 shown in FIG. 5(C). If an amount of movement of the brake wire 56 shown in FIG. 5(B) can be detected, in addition to the stretched amount, a brake lever operation amount corresponding to the amount of movement (see FIG. 17(B)) can be obtained, allowing the mechanical brake actuation point to be directly detected. Because this makes it possible to detect an actual mechanical brake actuation point even if the position thereof is changed, the regenerative brake action in the play stage (i.e., before the manual brake is engaged) can be maximized, thereby achieving the further increase in the efficiency of the regenerative charging. As described in Embodiment 1 above, the displacement measurement device of the present invention is capable of detecting a displacement in a range from the order of 0.1 μm to the order of tens of mm. Therefore, by arranging another measurement unit that has a configuration similar to the displacement measurement unit 70 described in Embodiment 1 above and that is capable of measuring a displacement on the order of tens of mm so as to detect the movement of the brake wire 56, both a stretched amount and an amount of movement of the brake wire 56 can be measured. However, in this case, each measurement unit needs to be provided with a light source. In contrast, Embodiment 3 described here makes it possible to measure a displacement at different positions and at difference detection sensitivities with a single light source. FIG. 11 is a diagram showing a basic configuration of this embodiment. FIG. 12 is a diagram showing a configuration example of a displacement measurement unit in an application example of this embodiment.

As shown in FIG. 11, a displacement measurement device 200 of this embodiment includes a first sensor unit 210 that is capable of detecting a displacement on the order of μm or the order of 0.1 μm, and a second sensor unit 220 that is capable of detecting a displacement on the order of mm. A configuration of the first sensor unit 210 is the same as the displacement measurement device 10 of Embodiment 1 above. On the other hand, the second sensor unit 220 includes the laser light source 12, the collimator lens 14, a third diffraction grating 222, a fourth diffraction grating 224, and a second optical sensor 226. The third diffraction grating 222 is disposed on the optical axis of zeroth-order light that travels straight through the second diffraction grating 18 of the first sensor unit 210, which in the direct light 24, and has a grating pitch P' that is different from that of the first and second diffraction gratings 16 and 18. The light that enters the third diffraction grating 222 is divided into the zeroth-order light that travels straight, which is the direct light 24, and the ±nth-order light, which is first-order diffracted light 223 in the example shown in the figure. The fourth diffraction grating 224 has the same grating pitch P' as the third diffraction grating 222, and is disposed so as to face and move relative to the third diffraction grating 222. The zeroth-order light, i.e., the direct light 24, and the ±nth-order light that have passed through the third diffraction grating 222 are further divided by the fourth diffraction grating 224 into the direct light 24 that is the zeroth-order light travelling straight and the ±nth-order light, which is the first-order diffracted light 225 in the example shown in the figure.

Among the diffracted light rays that have passed through the third diffraction grating 222 and the fourth diffraction grating 224, the second optical sensor 226 receives diffracted light travelling along the optical axis of the diffracted light of a prescribed order from the third diffraction grating 222, which is the first-order light in this embodiment. That is, the second optical sensor 226 receives the diffracted light 223 and 225, and detects the amount of interference light 228. Thereafter, from an interference pattern corresponding to the amount of movement of the fourth diffraction grating 224 relative to the third diffraction grating 222, or a signal thereof, a displacement amount between the third diffraction grating 222 and the fourth diffraction grating 224 in the axis direction is measured. The measurement of the displacement amount here is performed on the same principle as that of the measurement of the displacement amount of the second diffraction grating 18 relative to the first diffraction grating 16.

Next, an application example where the displacement measurement device of this embodiment is used for a displacement measurement unit of the electric assist bicycle 50 will be explained with reference to FIG. 12. The electric assist bicycle 50 and the brake mechanism thereof are the same as those in FIGS. 4 and 5 described in Embodiment 1 above. As shown in FIG. 12, a displacement measurement unit 230 has a case 232 that is mounted on the brake lever 54. In the case 232, a transparent resin molded body 236 is disposed so as to be able to move along the brake wire 56. The brake wire 56 is provided so as to run through a through-hole 238 formed in the upper side of the transparent resin molded body 236, and the brake wire 56 is secured by screws 240A and 240B at two positions that are respectively close to side surfaces 236A and 236B of the transparent resin molded body 236. The laser light source 12 is provided so as to be fitted in a circular recessed space formed on a side of the side surface 236A. The laser light source 12 is connected to a laser driver circuit 242 that is disposed on a side surface 232A of the case 232. Further, the collimator lens 14 is arranged in a space 244A, which is a slit that is formed so as to penetrate the transparent resin molded body 236 in the thickness direction, for example, and is secured by an adhesive or the like applied to the periphery thereof. The first diffraction grating 16 and the second diffraction grating 18 are arranged in a space 244B that penetrates in the thickness direction and that continues from the space 244A, and are secured by a transparent adhesive or the like applied to the respective rear surfaces thereof.

The third diffraction grating 222 is fitted in a recess formed in the other side surface 236B of the transparent resin molded body 236. A space 244C and a space 244D are provided in the transparent resin molded body 236. The space 244C becomes a passage of light that has passed through the second diffraction grating 18 and that enters the third diffraction grating 222. The space 244D becomes a passage of diffracted light that has passed through the first diffraction grating 16 and the second diffraction grating 18. In the back of the space 244D, the first optical sensor 20 is provided. The first optical sensor 20 is connected to an I/V conversion circuit 246 that is disposed outside of the case 232. The transparent resin molded body 236 is further provided with a slit 244E that penetrates in the thickness direction above the space 244B. This slit 244E is used to provide the transparent resin molded body 236 with a spring characteristic so that the transparent resin molded body 236 expands and shrinks in the axis direction (see the arrow F12b in FIG. 12) together with the brake wire 56 between the first diffraction grating 16 and the second diffraction grating 18. The transparent resin molded body 236 has no warp in the thickness direction.

On the lower side of the transparent resin molded body 236, a guide shaft 234 is provided so as to penetrate the molded body 234, and both ends thereof are secured to the case 232. This allows the transparent resin molded body 236 to move inside of the case 232 along the guide shaft 234 (see the arrow F12a in FIG. 12). On the other hand, inside of a side surface 232B of the case 232, the fourth diffraction grating 224 is disposed in a position facing the third diffraction grating 222. On the rear surface of this fourth diffraction grating 224, the second optical sensor 226 is disposed in a position near the optical axis. The second optical sensor 226 is arranged in a position near the optical axis so as to be able to receive diffracted light having a small diffraction angle. The second optical sensor 226 is connected to an I/V conversion circuit 248 that is provided outside of the case 232.

The material, shape, and dimensions of the transparent resin molded body 236 are the same as those of the transparent resin molded body 72 in Embodiment 1 above. As the laser light source 12, a laser diode is used in the same manner as Embodiment 1 above, and collimator 14, the first diffraction grating 16, and the second diffraction grating 18 are also configured in the same manner as those in Embodiment 1. As the third diffraction grating 222 and the fourth diffraction grating 224, diffraction gratings with the grating pitch P' of 300 µm are used. The diffraction directions of the third diffraction grating 222 and the fourth diffraction grating 224 are set to be the same. As the first optical sensor 20 and the second optical sensor 226, photodiodes are used in the same manner as Embodiment 1 above. As the I/V conversion circuits 246 and 248, circuits same as the I/V conversion circuit 82 of Embodiment 1 above are used. A configuration and an output waveform of optical detection circuits thereof are also the same as the above-mentioned configuration and output waveform shown in FIGS. 7(B) and 7(C).

In the displacement measurement unit 230, when a driver starts squeezing the brake lever 54 from the state shown in FIG. 5(A), the transparent resin molded body 236 moves along the arrow F 12a inside of the case 232. From a displacement amount between the third diffraction grating 222 and the fourth diffraction grating 224, an amount of movement of the brake wire 56, that is, an operation amount of the brake lever 54 that corresponds to the amount of movement can be measured on the order of mm. Also, tension applied to the brake wire 56 is detected from a displacement amount on the order of µm between the first diffraction grating 16 and the second diffraction grating 18 in the direction of the arrow F12b. This makes it possible to detect a point when the electric assist bicycle 50 shifts from the play stage to the mechanical brake stage, allowing the regenerative brake to be maximized before the start of the mechanical brake. According to this embodiment, even when the mechanical brake actuation point is moved due to a brake adjustment performed by a driver, because the mechanical brake actuation point after the adjustment can be directly detected, a high regenerative efficiency can always be realized.

As described, Embodiment 3 provides the following effects:

(1) By providing, in addition to the first diffraction grating 16 and the second diffraction grating 18, the third diffraction grating 222 and the fourth diffraction grating 224 that have the grating pitch P' that is different from that of these diffraction gratings 16 and 18, displacement amounts can be detected at different detection sensitivities and different positions by using a single laser light source 12.

(2) By using the displacement measurement device 200 of this embodiment as the displacement measurement unit 230 of the electric assist bicycle 50, the point where the driver starts squeezing the brake lever 54 can be detected from the measurement result of the amount of movement of the brake wire 56 that corresponds to the operation amount of the brake lever 54. Also, the point where the brake pads 60 make contact with the rim 62, which is the actuation point of the mechanical brake, can be detected from the measurement result of the tension, i.e., the stretched amount, of the brake wire 56 that corresponds to the brake operating force. Because the mechanical brake actuation point can be directly detected from these two detection results, the efficiency of the regenerative charging can be improved.

Embodiment 4

Figure 13:
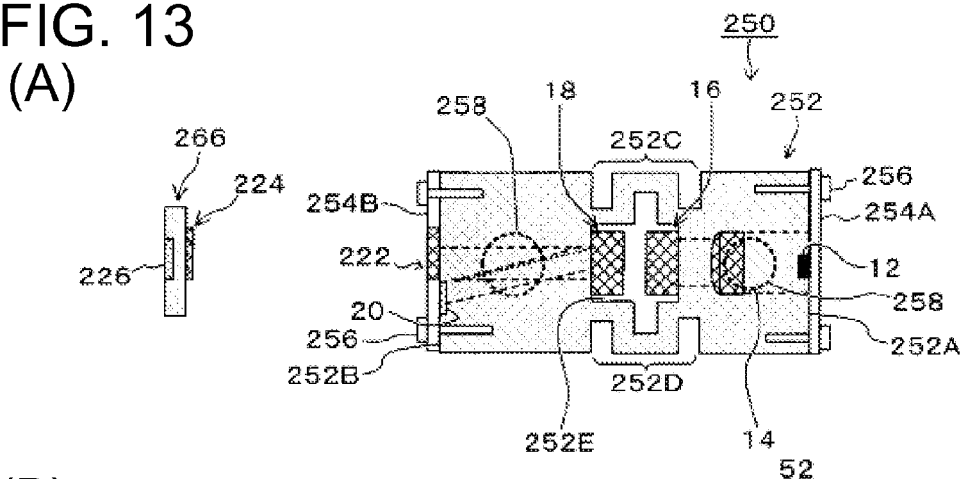
FIG. 13 shows Embodiment 4 of the present invention.
Figure 13:
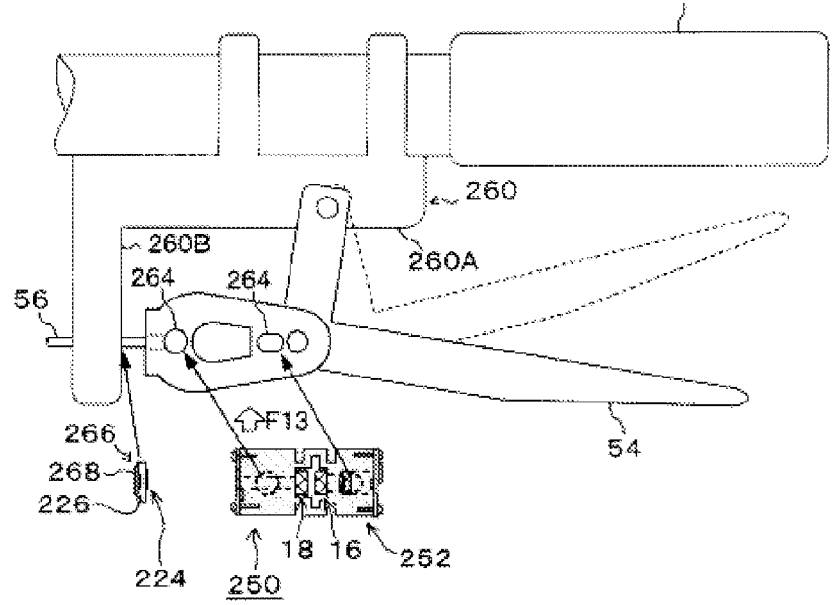
Figure 13:
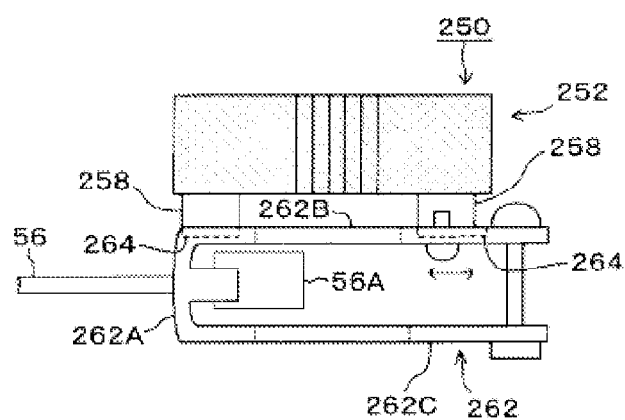

Next, Embodiment 4 of the present invention will be explained with reference to FIG. 13. Similar to Embodiment 3 above, this embodiment also makes it possible to detect both the operation amount and the operating force of the brake lever. However, while Embodiment 3 above is configured so as to detect the operating force by sensing the stretched amount of the brake wire 56, this embodiment is configured so as to detect an operating force by sensing a stretch in a wire attachment, which is a fitting that joins a brake lever and a brake wire together. FIG. 13(A) is a diagram showing a configuration of a displacement measurement unit of this embodiment. FIG. 13(B) is a diagram showing an example of attaching the displacement measurement unit to an electric assist bicycle. FIG. 13(C) is a diagram showing a part arrangement when viewing FIG. 13(B) from a side indicated with the arrow F13. As shown in FIG. 13(A), a displacement measurement unit 250 of this embodiment is constituted of a transparent resin molded body 252 that includes a first diffraction grating 16, a second diffraction grating 18, a third diffraction grating 222, a laser light source 12, and a first optical sensor 20, and a fourth diffraction grating 224 and a second optical sensor 226 that are disposed outside of the transparent resin molded body 252. A wire attachment 262 (FIG. 13(C)) will be briefly explained below. The wire attachment 262 is made of a side surface wall 262A that holds a wire stopper 56A attached to the end of the brake wire 56, an upper surface plate 262B, and a lower surface plate 262C. The upper surface plate 262B and the lower surface plate 262C are extended from the upper and lower edges of the side surface wall 262A toward a side of the brake lever 54 so as to face each other. It is preferable that this wire attachment 262 be made of a material that can be extended in a range of several µm to tens of µm upon application of tension from the brake wire 56, such as an alloy that is mainly made of steel, aluminum, copper, or the like.

On one end surface 252A of the transparent resin molded body 252, a circuit substrate 254A having thereon the laser light source 12 is attached by screws 256. On the other end surface 252B, a circuit substrate 254B having thereon the first optical sensor 20 and the third diffraction grating 222 is attached by the screws 256. Near the center portion of the transparent resin molded body 252, a space 252E is formed. The first diffraction grating 16 is disposed on one of side surfaces inside of the space 252E, and the second diffraction grating 18 is disposed on the other of the side surfaces. In the transparent resin molded body 252, elastic potions 252C and 252D made of a plurality of slits are formed on both sides of the space 252E, that is, above and below the space 252E in the example shown in FIG. 13(A). Further, inside of the transparent resin molded body 252, a collimator 14 is disposed between the light source 12 and the first diffraction grating 16. The transparent resin molded body 252 configured in the manner described above has protrusions 258 on the bottom surface. The fourth diffraction grating 224 and the second optical sensor 226 are attached to a transparent resin molded body 266.

As shown in FIG. 13(B), in an electric assist bicycle to which the displacement measurement unit 250 of this embodiment is to be attached, a longer side portion 260A of an attachment bracket 260 is secured to a shaft of the handle 52. At an appropriate position of this longer side portion 260A, the brake lever 54 is attached so as to be able to pivot. This brake lever 54 and the brake wire 56 are joined by the wire attachment 262. On the upper surface plate 262B of the wire attachment 262, recesses 264 are formed. By engaging the protrusions 258 formed on the bottom surface side of the transparent resin molded body 252 in the recesses 264, and by bonding them with an adhesive or the like, the transparent resin molded body 252 is attached to the wire attachment 262. The recess 264 on a side closer to the brake lever 54 is desirably shaped like an ellipse so that an attachment position of the transparent resin molded body 252 can be adjusted when attached to the upper surface plate 262B. On the other hand, the transparent resin molded body 266 including the fourth diffraction grating 224 and the second optical sensor 226 is secured to a shorter side portion 260B of the attachment bracket 260 such that the fourth diffraction grating 224 faces the third diffraction grating 222 by an appropriate method such as engaging a protrusion 268 in a recess formed on the shorter side portion 260B.

In this embodiment, when an operating force is applied to the brake wire 56, tensile stress is applied to the wire attachment 262, causing a relative displacement between the first diffraction grating 16 and the second diffraction grating 18 in the transparent resin molded body 252 attached to the wire attachment 262. By sensing this relative displacement, the operating force that corresponds to the displacement is detected in a manner similar to Embodiment 3. On the other hand, a brake operation amount is detected in a manner similar to Embodiment 3 by sensing a displacement of the third diffraction grating 222 on the moveable side (a side of the wire attachment 262) relative to the fourth diffraction grating 224 attached to the stationary side (a side of the attachment bracket shorter side portion 260B). As described, according to this embodiment, the effects similar to those of Embodiment 3 above can be obtained without attaching a transparent resin molded body to the brake wire 56.

Embodiment 5

Figure 14:
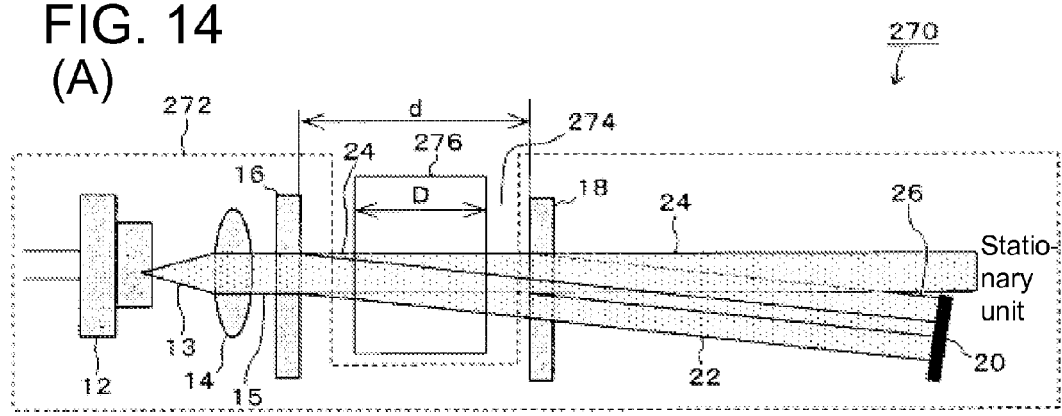
FIG. 14 is a diagram showing Embodiment 5 of the present invention.
Figure 14:
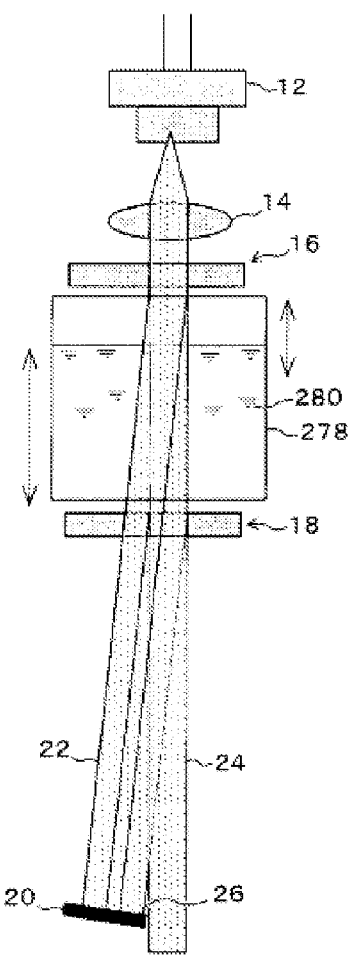

Next, Embodiment 5 of the present invention will be explained with reference to FIGS. 14(A) and 14(B). An example shown in FIG. 14(B) is an example of employing a displacement measurement device of the present invention for detecting a transparent body. While Embodiment 1 above is configured to detect an amount of movement of the second diffraction grating 18 upon displacement as a change of the interference state, this embodiment is configured to detect an amount of liquid or the like by detecting a change of the interference state when a medium having a refractive index of 1 or greater is inserted between the first diffraction grating 16 and the second diffraction grating 18. A transparent body detection sensor 270 shown in FIG. 14(A) is configured to have a transparent resin molded body 272 including therein a laser light source 12, a collimator lens 14, a first diffraction grating 16, a second diffraction grating 18, and a first optical sensor 20. In the transparent resin molded body 272, a pocket-shaped recess 274 is formed so that a distance between the first diffraction grating 16 and the second diffraction grating 18 can be adjusted.

In an initial state where a transparent body 276 is not inserted in the recess 274, a diffraction interference system of the distance "d" between the diffraction gratings 16 and 18 is constructed, and at this time, the first optical sensor 20 receives an amount of interference light that corresponds to a path difference Δd represented by the following Formula 6 (φ is a diffraction angle).

$$\Delta d = d/\cos(\phi) \quad \text{Formula 6}$$

Next, when the transparent body 276 is inserted between the first diffraction grating 16 and the second diffraction grating 18, an optical path difference that corresponds to the refractive index of the transparent body 276 is generated, thereby making it possible to detect a thickness of the transparent body 276. The path length difference ΔD can be represented by Formula 7 below, where D is a length (thickness) of the transparent body and In is the refractive index, for example, and the thickness of the transparent body 276 can therefore be detected.

$$\Delta D = (D/\cos(\phi))/In \quad \text{Formula 7}$$

FIG. 14(B) shows an example of employing the transparent body detection sensor 270 for detecting a remaining amount of transparent liquid. This figure shows a configuration in which a liquid tank 278 is disposed between the first diffraction grating 16 and the second diffraction grating 18, and the remaining amount is detected from a thickness (or a depth) of transparent liquid 280 inside of the liquid tank 278. As described, according to Embodiment 4, by detecting a change of the interference state of the light rays that have passed through the first diffraction grating 16 and the second diffraction grating 18, the thickness of the transparent body inserted between the diffraction gratings 16 and 18 can be detected, and the remaining amount of the transparent body can therefore be detected.

The present invention is not limited to the above-mentioned embodiments, and various modifications can be made without departing from the scope of the present invention.

Figure 15:
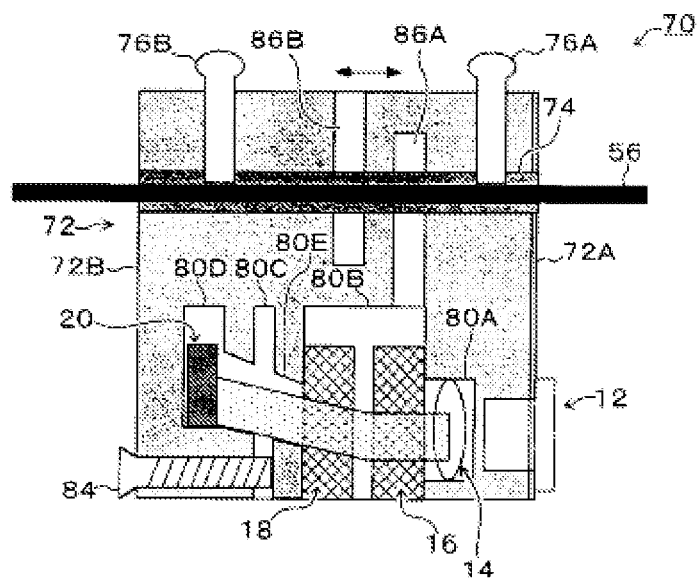
FIG. 15 is a diagram showing another embodiment of the present invention.
Figure 15:
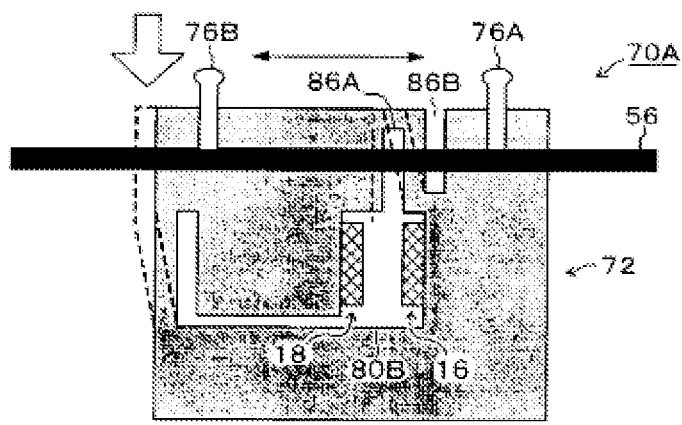
Figure 15:
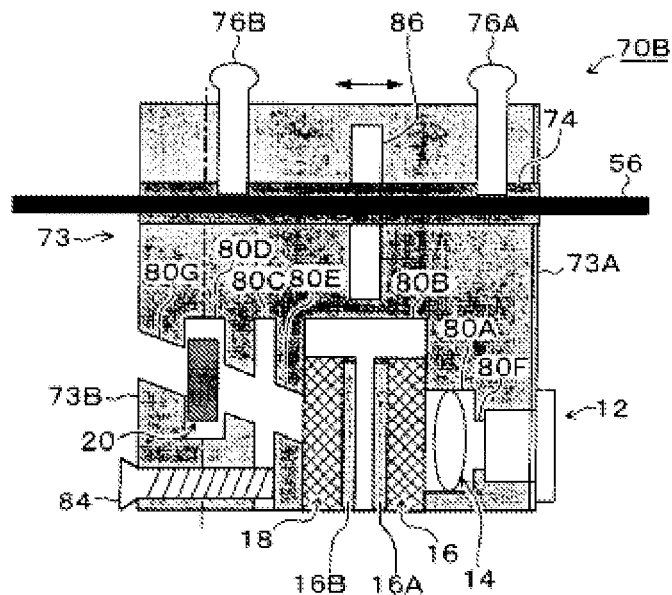

(1) The shapes, dimensions, and materials described in the above-mentioned embodiments are examples. They may be appropriately changed if necessary as long as the same effects can be obtained. In the application example of Embodiment 1 above, for example, the transparent resin molded body 72 was used for the displacement measurement unit 70. However, in view of using a material that has the same linear thermal expansion coefficient as the brake wire 56, a molded body formed of a metal such as an alloy of aluminum, zinc, or the like by die-casting or the like may alternatively be used, for example. When a metal molded body 73 is used, as shown with a displacement measurement unit 70B in FIG. 15(C), a path 80F needs to be formed so as to connect the laser light source 12 to the space 80A. The space 80E is formed so as to be substantially cylindrical, and in order to form such a space 80E, as shown in FIG. 15(C), a space 80G that has the same axis and as indicated with a chain line in the same figure, the space 80E may also be formed by splitting the metal molded body 73 into two parts, and by thereafter bonding them together at a position corresponding to the space 80D. The space 80E is formed in the same manner when a transparent resin molded body is used as well.

(2) In the application example of Embodiment 1 above, a spring characteristic was provided to the transparent resin molded body 72 by the slit 86 formed near the two diffraction gratings 16 and 18. However, this is also an example, and as shown with a displacement measurement unit 70 in FIG. 15(A), the transparent resin molded body 72 may also be provided with a slit 86A that is formed so as to continue from the space 80B on a side of the first diffraction grating 16, and a slit 86B that is formed on a side closer to the second diffraction grating 18 so as to have an opening toward the upper surface side of the transparent resin molded body 72. Alternatively, as shown with a displacement measurement unit 70A in FIG. 15(B), the positions of the slits 86A and 86B may be switched along the axis direction, which is the axis direction of the brake wire 56. By providing the two slits 86A and 86B as in the manners described with these displacement measurement units 70 and 70A, the second diffraction grating 18 on the moveable side can reliably move while maintaining parallelism with respect to the first diffraction grating 16 on the stationary side, thereby allowing for an accurate measurement of the amount of movement. It is apparent that the configurations shown in FIGS. 15(A) and 15(B) are also examples, and the designs thereof can be appropriately changed as long as the same effects can be obtained. The same applies to the application example of Embodiment 3.

(3) Embodiment 3 above is also an example, and one or more pairs of diffraction gratings that have the same function may further be disposed behind the third and fourth diffraction gratings 222 and 224.

(4) In Embodiment 1 above, the displacement measurement was performed by utilizing the zeroth-order diffracted light and the positive first-order diffracted light. However, this is also an example, and diffracted light of appropriate orders other than the positive first-order diffracted light (second-order light, for example) may also be used. Light that passes through the diffraction gratings 16 and 18 of Embodiment 1 above also includes not only the above-mentioned optical paths L1 and L2, but also optical paths L3 and L4 shown in FIG. 16(A), for example. The optical path L3 is the first-order light of the first diffraction grating 16, and the negative first-order light of the second diffraction grating 18. The optical path L4 is the zeroth-order light of the first diffraction grating 16 and the zeroth-order light of the second diffraction grating 18. In this example, the optical paths L3 and L4 are interfered with each other, and it is also possible to measure a displacement from this interference light. That is, if light rays that are diffracted in different ways by the first diffraction grating 16 (including the zeroth-order light) become diffracted light rays traveling along the same optical axis after passing through the second diffraction grating 18, these light rays can be measured as the interference light. The same applies to the third diffraction grating 222 and the fourth diffraction grating 224 of Embodiment 3 above.

Figure 16:
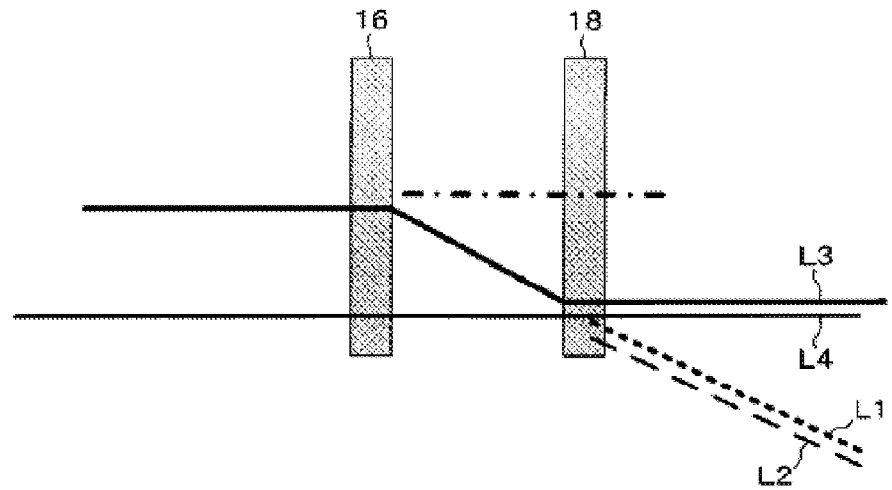
FIG. 16 is a diagram showing another embodiment of the present invention.
Figure 16:
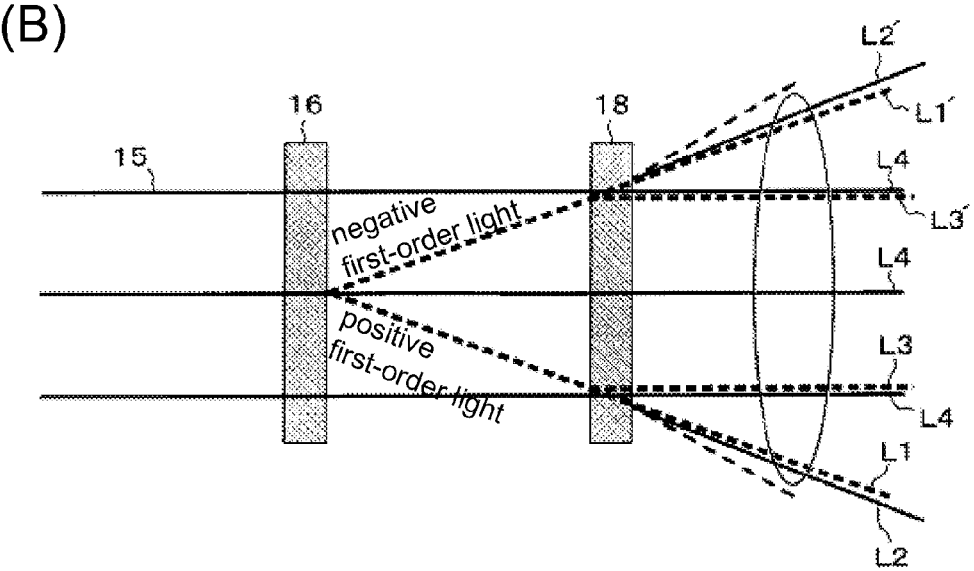

The above-mentioned example shown in FIG. 16(A) can also be used for a mm sensor. In the mm sensor, a diffraction grating having a smaller diffraction angle is used so as to extend the detection distance. As shown in Table 1 above, for example, in the sensor having a detection range of about 15.4 mm, the diffraction grating pitch becomes 100 μm, and the diffraction angle φ becomes about 0.37 degrees. When the diffraction angle φ is small like this, it is difficult to find a pair of interfering beams among a plurality of interfering beams by separating them based on emergence angles. When the beams are to be separated based on the emergence angles, it is necessary to place the first optical sensor 20 several tens of mm away from the second diffraction grating 18 so that target two interfering beams are not overlapped by other beams, and that the first optical sensor 20 can detect only the target interfering beams. In this case, the distance between the light source and the position where the sensor is disposed would become greater, thereby making it difficult to reduce the size of the entire displacement measurement device.

However, in the present invention, when patterns of all bright and dark lines of a plurality of interference beams are the same, the bright and dark lines detection can be accomplished by combining the plurality of interference beams, instead of using a single interference beam that has been separated, thereby eliminating the need to separate the interference beams based on the emergence angles. In the diffraction grating 16 and the diffraction grating 18, an adjustment of the ratio of the light intensity of diffracted light such as the zeroth-order light, first-order light, and light of the second order or greater is generally made by changing design parameters of gratings in manufacturing. By optimizing the depth and the width of the grating, which are the design parameters, the gratings can be designed so that the ratio of the zeroth-order light to the first-order light becomes 2:1 and that the diffracted light of second order or greater has intensities that can be almost ignored. When using the diffraction gratings 16 and 18 configured in the manner described above, as shown in FIG. 16(B), the parallel light 15 that entered the first diffraction grating 16 is divided by passing through the first diffraction grating 16 into the zeroth-order light and positive and negative first-order light rays. The respective light rays thereafter pass through the second diffraction grating 18, thereby being further divided into the zeroth-order light and the ±first-order light.

As shown in FIG. 16(B), among light rays that have passed through the second diffraction grating 18, the optical path L1, which is the positive first-order light of the first diffraction grating 16 and is zeroth-order light of the second diffraction grating 18, and the optical path L2, which is the zeroth-order light of the first diffraction grating 16 and is the positive first-order light of the second diffraction grating 18, travel in the same direction, and therefore cause interference. Further, an optical path L1', which is the negative first-order light of the first diffraction grating 16 and is the zeroth-order light of the second diffraction grating 18, and an optical path L2', which is the zeroth-order light of the first diffraction grating 16 and is the negative first-order light of the second diffraction grating 18, travel in the same direction, and therefore cause interference.

Other light rays that can produce interferences include an optical path L3, which is positive first-order light of the first diffraction grating 16 and is negative first-order light of the second diffraction grating, and an optical path L3', which is negative first-order light of the first diffraction grating 16 and is positive first-order light of the second diffraction grating 18. The optical path L3 and an optical path L4, which is the zeroth-order light of the first diffraction grating 16 and is the zeroth-order light of the second diffraction grating 18, travel in the same direction, and therefore cause interference. Similarly, the other optical path L3' and the optical path L4 travel in the same direction, and therefore cause interference. That is, with respect to the movement of the second diffraction grating 18 in the axis direction, the signals of the same bright and dark pattern are generated as a result of between L3 and L4, and the interference between L3' and L4, and therefore, the first optical sensor 20 can detect the interference beam without separating these beams by emergence angles.

(5) With regard to Embodiment 3 above, in the second diffraction grating 18 and/or the fourth diffraction grating 224, the phase plate 104 may be provided in the manner similar to Embodiment 2. Alternatively, a diffraction grating provided with two areas having grating patterns that are offset from each other by one-half, one-quarter, or three-quarter of a grating pitch may be used as the second or fourth diffraction grating in a manner similar to the modification example of Embodiment 2. In such a case, the first optical sensor 20 and the second optical sensor 226 may be a dual-element optical sensor. The offset grating patterns may be provided in one of the first diffraction grating 16 and the second diffraction grating 18, and one of the third diffraction grating 222 and the fourth diffraction grating 224. The offset amount of the grating patterns can be appropriately selected from one-half, one-quarter, and three-quarter of the grating pitch for the pair of the first diffraction grating 16 and the second diffraction grating 18 and for the pair of the third diffraction grating 222 and the fourth diffraction gratin 224 independently.

(6) In the above-mentioned embodiments, the laser light source 12 was used as a light source. However, this is also an example, and an inexpensive low-coherent light source such as an LED may also be used. When an LED with the coherence length of about several μm is used, it is necessary to design the device such that the path difference $\Delta$ shown in FIGS. 3(A) and 3(B) becomes equal to or smaller than the coherence length of the LED. The path difference shown in FIG. 3(B) can be derived from Formula 3 as described above. Therefore, in configuring a sensor that has the detection range of 3.6 mm, for example, when $\Delta$d is 3.6 mm and the diffraction angle $\phi$ is 0.76°, the path difference $\Delta$ becomes 0.36 μm. That is, the path difference between the two light rays interfering with each other becomes smaller than the coherence distance or the coherence length of the LED, which is several μm. This means that the path difference stays within the critical range of the measurement, and it can therefore be measured. As described above, the diffraction angle $\phi$ can be appropriately adjusted by changing the grating pitch P.

(7) In Embodiment 1 above, a configuration where a braking force is detected by measuring a stretch, i.e., a displacement amount, caused by tension in the brake wire of the electric assist bicycle 50 has been described as the application example. However, the displacement measurement unit 70 may also be disposed in the middle of the tube 58 that supports the brake wire 56 so that a braking force can be detected by stress applied to the displacement measurement unit 70 in the length direction of the brake wire 56.

(8) In the embodiments above, devices that can apply the regenerative brake efficiently in the electric assist bicycle 50 by detecting a stretched amount of the brake wire 56 or by detecting both the stretched amount and an amount of movement have been described as specific examples. However, they are merely examples, and the present invention can be used for all kinds of small displacement measurements such as strain measurement in a mechanical system, a calibration of measuring tools having very small scales, and the like. In the zooming and focusing functions of a camera, for example, position detection is currently performed by employing the position detection switching array, however, by utilizing the present invention, it becomes possible to fulfill demands for size reduction and elimination of a flexible board in the position detection device. Also, because the expansion of the detection range makes it possible to linearly detect a movement that is equal to or greater than a wavelength, the present invention can also be used for an optical microphone and the like. Further, the present invention is capable of detecting very small vibrations, and therefore, it can also be used for a vibration sensor and the like.

According to the present invention, light emitted from the light source passes through a collimator lens and therefore becomes parallel light that travels straight, and the parallel light is divided by a first diffraction grating on the stationary side into the zeroth-order light that travels straight and the ±nth-order diffracted light. The respective zeroth-order light and the ±nth-order light are further divided into the zeroth-order light that travels straight and the ±nth-order light by passing through a second diffraction grating on the moveable side that has the same grating pitch as that of the first diffraction grating and that faces the first diffraction grating. Among light rays diffracted by the first and second diffraction gratings, at least one pair of interference light travelling along the optical axis of the light of a prescribed order that has been diffracted by the first diffraction grating is received by a first optical sensor, and therefore, the light amount is detected. This makes it possible to measure the displacement between the first diffraction grating and the second diffraction grating in the direction of the optical axis of the parallel light in a wide range from about 0.1 μm to about tens of mm from the interference pattern corresponding to the amount of movement of the second diffraction grating, or the signal thereof. Therefore, the present invention can be employed for a displacement measurement device that is used to measure a very small displacement. Because the present invention can achieve accurate measurements without requiring an adjustment for temperatures or environments in particular, it can be suitably used for various purposes such as measurement of strain or distortion in a mechanical system or detection of a stretch in a brake wire of an electric assist bicycle.

If necessary, the present invention can be configured such that the zeroth-order light that has passed through the second diffraction grating enters third and fourth diffraction gratings that function in a manner similar to the first and second diffraction gratings and that have a different grating pitch, and among the diffracted light rays that have passed through these diffraction gratings, at least one pair of interfering light rays travelling along the optical axis of diffracted light of a prescribed order from the third diffraction grating is received by the second optical sensor. This makes it possible to measure the displacement amount between the third diffraction grating and the fourth diffraction grating in the direction of the optical axis of the parallel light from the interference pattern corresponding to the amount of movement of the fourth displacement, or the signal thereof. As a result, displacement measurements for a different position with a different sensitivity from the displacement measurements between the first and second diffraction gratings can be performed simultaneously or successively with a single light source. Thus, the present invention can be suitably used for a sensor when there are a plurality of detection targets of displacement measurement (such as a stretched amount and an amount of movement of a brake wire of an electric assist bicycle, for example).

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

The invention claimed is:

1. A method for measuring displacement, comprising:
   turning light emitted from a light source into parallel light by a collimator lens;
   dividing the parallel light by a first transmissive diffraction grating disposed on an optical axis of the parallel light into zeroth-order light, which travels in the same direction as that of said parallel light, and ±nth-order light having diffraction angles relative to said zeroth-order light, where n is a positive integer of 1 or greater;

dividing, by a second transmissive diffraction grating, the zeroth-order light and the ±nth-order light that have passed through the first transmissive diffraction grating into zeroth-order light and ±nth-order light, the second transmissive diffraction grating having a same grating pitch as the first transmissive diffraction grating and being disposed so as to face and be movable relative to said first transmissive diffraction grating;

receiving, by a first optical sensor, among diffracted light rays that have passed through both the first and second transmissive diffraction gratings, at least one pair of interfering light rays travelling along an optical axis of one of the zeroth-order light, the positive nth-order light, and the negative nth-order light from the first transmissive diffraction grating to detect an amount of light received, said one pair of interfering light rays having mutually overlapping portions when emerging from the second transmissive diffraction grating, optical path lengths of said one pair of interfering light rays reaching the first optical sensor being different from each other, and a difference in the optical path lengths being dependent on a displacement between the first and second transmissive diffraction gratings in the direction of the optical axis of the parallel light so that destructive or constructive interference occurs between said one pair of interfering light rays in said mutually overlapping portions depending on the displacement between the first and second transmissive diffraction gratings, wherein said first optical sensor is disposed at a location where said mutually overlapping portions of the one pair of interference light rays from the second transmissive diffraction grating are present; and determining an amount of the displacement between the first and second transmissive diffraction gratings in the direction of the optical axis of the parallel light on a basis of said amount of light received by the first optical sensor.

2. The displacement measurement method according to claim 1, wherein the first and second transmissive diffraction gratings are provided with a grating pattern in which light intensity ratios of diffracted light rays are adjusted such that that zeroth-order light and ±first-order light can be used for measuring a displacement between the first and second transmissive diffraction gratings in the optical axis direction of the parallel light.

3. The displacement measurement method according to claim 1, further comprising:

dividing, by a third transmissive diffraction grating, the zeroth-order light from the second transmissive diffraction grating, into zeroth-order light and ±nth-order light, the third transmissive diffraction grating being disposed separately from the first and second transmissive diffraction gratings on the same optical axis direction as the optical axis of the first and second transmissive diffraction gratings and having a grating pitch different from that of the first and second transmissive diffraction gratings;

dividing, by a fourth transmissive diffraction grating, the zeroth-order light and the ±nth-order light that have passed through the third transmissive diffraction grating into zeroth-order light and ±nth-order light, the fourth transmissive diffraction grating having a same grating pitch as that of the third transmissive diffraction grating and being disposed to so as to face and be movable relative to said third transmissive diffraction grating;

receiving, by a second optical sensor, among diffracted light rays that have passed through the third and fourth transmissive diffraction gratings, at least one pair of interfering light rays travelling along an optical axis of one of the zeroth-order light, the positive nth-order light, and the negative nth-order light from the third transmissive diffraction grating to detect an amount of light received;

determining an amount of a displacement between the third and fourth transmissive diffraction gratings in the direction of the optical axis of the parallel light on a basis of said amount of light received by the second optical sensor.

4. The displacement measurement method according to claim 3, wherein the third and fourth transmissive diffraction gratings are provided with a grating pattern in which light intensity ratios of diffracted light rays are adjusted such that that zeroth-order light and ±first-order light can be used for measuring a displacement between the third and fourth transmissive diffraction gratings in the optical axis direction of the parallel light.

5. A displacement measurement device, comprising:

a light source;

a collimator lens for converting light emitted from the light source to parallel light;

a first transmissive diffraction grating disposed on an optical axis of the parallel light, the first transmissive diffraction grating dividing said parallel light into zeroth-order light and ±nth-order light;

a second transmissive diffraction grating that has a same grating pitch as that of the first transmissive diffraction grating and that is disposed so as to face and be movable relative to said first transmissive diffraction grating, the second transmissive diffraction grating dividing the zeroth-order light and the ±nth-order light that have passed through the first transmissive diffraction grating, into zeroth-order light and ±nth-order light; and a first optical sensor that receives, among diffracted light rays that have passed through both the first and second transmissive diffraction gratings, at least one pair of interfering light beams travelling along an optical axis of one of the diffracted light rays of zeroth-order light, positive nth-order light, and negative nth-order light from the first transmissive diffraction grating to detect an amount of light received for determining an amount of a displacement of the second transmissive diffraction grating relative to the first transmissive diffraction grating in the direction of the optical axis of the parallel light, said one pair of interfering light rays having mutually overlapping portions when emerging from the second transmissive diffraction grating, optical path lengths of said one pair of interfering light rays reaching the first optical sensor being different from each other, and a difference in the optical path lengths being dependent on a displacement between the first and second transmissive diffraction gratings in the direction of the optical axis of the parallel light so that destructive or constructive interference occurs between said one pair of interfering light rays in said mutually overlapping portions depending on the displacement between the first and second transmissive diffraction gratings, and said first optical sensor being disposed at a location where said mutually overlapping portions of the one pair of interference light rays from the second transmissive diffraction grating are present.

6. The displacement measurement device according to claim 5, wherein the first and second transmissive diffraction gratings are provided with a grating pattern in which light intensity ratios of diffracted light rays are adjusted such that that zeroth-order light and ±first-order light can be used for measuring a displacement between the first and second transmissive diffraction gratings in the optical axis direction of the parallel light.

7. The displacement measurement device according to claim 5, further comprising:
a phase plate creating a step on a diffraction surface of the second transmissive diffraction grating;
a dual-element optical sensor as the optical sensor; and
a calculation unit that processes two signals that are output from the dual-element optical sensor.

8. The displacement measurement device according to claim 5, wherein the second transmissive diffraction grating has two areas that respectively include grating patterns having a same grating pitch, and the entire grating pattern of one of the areas is offset relative to the grating pattern of the other area by an offset amount that is one of one-half, one-quarter, and three-quarter of the grating pitch, the displacement measurement device further comprising:
a dual-element optical sensor as the optical sensor; and
a calculation unit that processes two signals that are output from the dual-element optical sensor.

9. The displacement measurement device according to claim 5, wherein the light source, the collimator lens, the first transmissive diffraction grating, the second transmissive diffraction grating, and the first optical sensor are provided in spaces formed inside of a transparent resin molded body, and
wherein the transparent resin molded body has a spring characteristic that allows the transparent resin molded body to expand and shrink between the first transmissive diffraction grating and the second transmissive diffraction grating while keeping the first and second transmissive diffraction gratings in parallel with each other.

10. The displacement measurement device according to claim 5, further comprising:
a third transmissive diffraction grating that is disposed separately from the first and second transmissive diffraction gratings on the same optical axis direction as the optical axis of the first and second transmissive diffraction gratings and that has a grating pitch different from that of the first and second transmissive diffraction gratings, the third transmissive diffraction grating dividing the zeroth-order light that has passed through the second transmissive diffraction grating into zeroth-order light that travels straight and ±nth-order light;
a fourth transmissive diffraction grating that has a same grating pitch as that of the third transmissive diffraction grating and that is disposed so as to face and be moveable relative to said third transmissive diffraction grating, the fourth transmissive diffraction grating dividing the zeroth-order light and the ±nth-order light that have passed through the third transmissive diffraction grating into zeroth-order light that travels straight and ±nth-order light; and
a second optical sensor that receives, among diffracted light rays that have passed through the third and fourth transmissive diffraction gratings, at least one pair of interfering light rays travelling along an optical axis of one of the zeroth-order light, the positive nth-order light, and the negative nth-order light from the third transmissive diffraction grating to detect an amount of light received for determining an amount of a displacement of the fourth transmissive diffraction grating relative to the third transmissive diffraction grating in the direction of the optical axis of the parallel light.

11. The displacement measurement device according to claim 10, wherein the third and fourth transmissive diffraction gratings are provided with a grating pattern in which light intensity ratios of diffracted light rays are adjusted such that that zeroth-order light and ±first-order light can be used for measuring a displacement between the third and fourth transmissive diffraction gratings in the optical axis direction of the parallel light.

12. The displacement measurement device according to claim 10, further comprising:
a phase plate creating a step on one of a diffraction surface of the second transmissive diffraction grating and a diffraction surface of the fourth transmissive diffraction grating;
a dual-element optical sensor as at least one of the first and second optical sensors; and
a calculation unit that processes two signals that are output from the dual-element optical sensor.

13. The displacement measurement device according to claim 10, wherein one of the first and second transmissive diffraction gratings and one of the third and fourth transmissive diffraction gratings are provided with two areas that respectively include grating patterns having a same grating pitch, and the entire grating pattern of one of the areas is offset relative to the grating pattern of the other area by an offset amount that is one of one-half, one-quarter, and three-quarter of the grating pitch, the displacement measurement device further comprising:
a dual-element optical sensor as at least one of the first and second optical sensors; and
a calculation unit that processes two signals that are output from the dual-element optical sensor.

14. The displacement measurement device according to claim 10, wherein the light source, the collimator lens, the first transmissive diffraction grating, the second transmissive diffraction grating, and the first optical sensor are provided in spaces formed inside of a transparent resin molded body,
wherein the third transmissive diffraction grating is disposed on one end surface of the transparent resin molded body,
wherein the fourth transmissive diffraction grating and the second optical sensor are disposed outside of the transparent resin molded body such that the fourth transmissive diffraction grating faces the third transmissive diffraction grating,
wherein the transparent resin molded body has a spring characteristic that allows the transparent resin molded body to expand and shrink between the first transmissive diffraction grating and the second transmissive diffraction grating while keeping the first and second transmissive diffraction gratings in parallel with each other, and
wherein the fourth transmissive diffraction grating is moveable relative to the transparent resin molded body.

15. A device for measuring a displacement of a first point relative to a second point, the first point being moveable relative to the second point in a first direction, the device comprising:
a light source emitting substantially parallel light, the parallel light being substantially in parallel to the first direction and having a spatial coherence;
a first diffraction grating fixed relative to the first point and disposed on an optical axis of the parallel light, the first diffraction grating receiving the parallel light and diffracting a portion of the parallel light to transmit first diffraction light of a prescribed diffraction order in a second direction, the first diffraction grating transmitting a portion of the parallel light as zeroth-order light in the first direction;

a second diffraction grating that has a same grating pitch as that of the first diffraction grating, the second diffraction being fixed relative to the second point and disposed so as to face said first diffraction grating, the second diffraction grating receiving the zeroth-order light transmitted from the first diffraction grating and diffracting the received zeroth-order light to transmit second diffraction light of said prescribed diffraction order in the second direction, the second diffraction grating receiving the first diffraction light of said prescribed diffraction order from the first diffraction grating and transmitting, as a zeroth-order light without diffraction, the first diffraction light in the second direction such that the diffraction light and the second diffraction light have mutually overlapping portions when emerging from the second diffraction grating;

an optical sensor disposed to receive said mutually overlapping portions of the first diffraction light and the second diffraction light from the second diffraction grating to output a signal representing an interference between the first diffraction light and the second diffraction light that occurs in said mutually overlapping portions, wherein the optical sensor is disposed at a location where said mutually overlapping portions are present; and a calculation unit that processes the signal representing the interference between the first diffraction light and the second diffraction light in said mutually overlapping portions to determine an amount of the displacement of the first point relative to the second point.

16. A method for measuring displacement, comprising:
turning light emitted from a light source into parallel light by a collimator lens;
dividing the parallel light by a first diffraction grating disposed on an optical axis of the parallel light into zeroth-order light, which travels in the same direction as that of said parallel light, and ±nth-order light having diffraction angles relative to said zeroth-order light, where n is a positive integer of 1 or greater;
dividing, by a second diffraction grating, the zeroth-order light and the ±nth-order light that have passed through the first diffraction grating into zeroth-order light and ±nth-order light, the second diffraction grating having a same grating pitch as the first diffraction grating and being disposed so as to face and be movable relative to said first diffraction grating;
receiving, by a first optical sensor, among diffracted light rays that have passed through the first and second diffraction gratings, at least one pair of interfering light rays travelling along an optical axis of one of the zeroth-order light, the positive nth-order light, and the negative nth-order light from the first diffraction grating to detect an amount of light received;
determining an amount of the displacement between the first and second diffraction gratings in the direction of the optical axis of the parallel light on a basis of said amount of light received by the first optical sensor;
dividing, by a third diffraction grating, the zeroth-order light from the second diffraction grating, into zeroth-order light and ±nth-order light, the third diffraction grating being disposed separately from the first and second diffraction gratings on the same optical axis direction as the optical axis of the first and second diffraction gratings and having a grating pitch different from that of the first and second diffraction gratings;

dividing, by a fourth diffraction grating, the zeroth-order light and the ±nth-order light that have passed through the third diffraction grating into zeroth-order light and ±nth-order light, the fourth diffraction grating having a same grating pitch as that of the third diffraction grating and being disposed to so as to face and be movable relative to said third diffraction grating;

receiving, by a second optical sensor, among diffracted light rays that have passed through the third and fourth diffraction gratings, at least one pair of interfering light rays travelling along an optical axis of one of the zeroth-order light, the positive nth-order light, and the negative nth-order light from the third diffraction grating to detect an amount of light received; and determining an amount of a displacement between the third and fourth diffraction gratings in the direction of the optical axis of the parallel light on a basis of said amount of light received by the second optical sensor.

17. The displacement measurement method according to claim 16, wherein the third and fourth diffraction gratings are provided with a grating pattern in which light intensity ratios of diffracted light rays are adjusted such that that zeroth-order light and ±first-order light can be used for measuring a displacement between the third and fourth diffraction gratings in the optical axis direction of the parallel light.

18. A displacement measurement device, comprising:
a light source;
a collimator lens for converting light emitted from the light source to parallel light;
a first diffraction grating disposed on an optical axis of the parallel light, the first diffraction grating dividing said parallel light into zeroth-order light and ±nth-order light;
a second diffraction grating that has a same grating pitch as that of the first diffraction grating and that is disposed so as to face and be movable relative to said first diffraction grating, the second diffraction grating dividing the zeroth-order light and the ±nth-order light that have passed through the first diffraction grating, into zeroth-order light and ±nth-order light;
a first optical sensor that receives, among diffracted light rays that have passed through the first and second diffraction gratings, at least one pair of interfering light beams travelling along an optical axis of one of the diffracted light rays of zeroth-order light, positive nth-order light, and negative nth-order light from the first diffraction grating to detect an amount of light received for determining an amount of a displacement of the second diffraction grating relative to the first diffraction grating in the direction of the optical axis of the parallel light;
a phase plate creating a step on a diffraction surface of the second diffraction grating;
a dual-element optical sensor as the optical sensor; and
a calculation unit that processes two signals that are output from the dual-element optical sensor.

19. A displacement measurement device, comprising:
a light source;
a collimator lens for converting light emitted from the light source to parallel light;
a first diffraction grating disposed on an optical axis of the parallel light, the first diffraction grating dividing said parallel light into zeroth-order light and ±nth-order light;

a second diffraction grating that has a same grating pitch as that of the first diffraction grating and that is disposed so as to face and be movable relative to said first diffraction grating, the second diffraction grating dividing the zeroth-order light and the ±nth-order light that have passed through the first diffraction grating, into zeroth-order light and ±nth-order light; and a first optical sensor that receives, among diffracted light rays that have passed through the first and second diffraction gratings, at least one pair of interfering light beams travelling along an optical axis of one of the diffracted light rays of zeroth-order light, positive nth-order light, and negative nth-order light from the first diffraction grating to detect an amount of light received for determining an amount of a displacement of the second diffraction grating relative to the first diffraction grating in the direction of the optical axis of the parallel light, wherein the light source, the collimator lens, the first diffraction grating, the second diffraction grating, and the first optical sensor are provided in spaces formed inside of a transparent resin molded body, and wherein the transparent resin molded body has a spring characteristic that allows the transparent resin molded body to expand and shrink between the first diffraction grating and the second diffraction grating while keeping the first and second diffraction gratings in parallel with each other.

20. A displacement measurement device, comprising:
a light source;
a collimator lens for converting light emitted from the light source to parallel light;
a first diffraction grating disposed on an optical axis of the parallel light, the first diffraction grating dividing said parallel light into zeroth-order light and ±nth-order light;
a second diffraction grating that has a same grating pitch as that of the first diffraction grating and that is disposed so as to face and be movable relative to said first diffraction grating, the second diffraction grating dividing the zeroth-order light and the ±nth-order light that have passed through the first diffraction grating, into zeroth-order light and ±nth-order light;
a first optical sensor that receives, among diffracted light rays that have passed through the first and second diffraction gratings, at least one pair of interfering light beams travelling along an optical axis of one of the diffracted light rays of zeroth-order light, positive nth-order light, and negative nth-order light from the first diffraction grating to detect an amount of light received for determining an amount of a displacement of the second diffraction grating relative to the first diffraction grating in the direction of the optical axis of the parallel light;
a third diffraction grating that is disposed separately from the first and second diffraction gratings on the same optical axis direction as the optical axis of the first and second diffraction gratings and that has a grating pitch different from that of the first and second diffraction gratings, the third diffraction grating dividing the zeroth-order light that has passed through the second diffraction grating into zeroth-order light that travels straight and ±nth-order light;
a fourth diffraction grating that has a same grating pitch as that of the third diffraction grating and that is disposed so as to face and be moveable relative to said third diffraction grating, the fourth diffraction grating dividing the zeroth-order light and the ±nth-order light that have passed through the third diffraction grating into zeroth-order light that travels straight and ±nth-order light; and a second optical sensor that receives, among diffracted light rays that have passed through the third and fourth diffraction gratings, at least one pair of interfering light rays travelling along an optical axis of one of the zeroth-order light, the positive nth-order light, and the negative nth-order light from the third diffraction grating to detect an amount of light received for determining an amount of a displacement of the fourth diffraction grating relative to the third diffraction grating in the direction of the optical axis of the parallel light.

21. The displacement measurement device according to claim 20, wherein the third and fourth diffraction gratings are provided with a grating pattern in which light intensity ratios of diffracted light rays are adjusted such that that zeroth-order light and ±first-order light can be used for measuring a displacement between the third and fourth diffraction gratings in the optical axis direction of the parallel light.

22. The displacement measurement device according to claim 20, further comprising:
a phase plate creating a step on one of a diffraction surface of the second diffraction grating and a diffraction surface of the fourth diffraction grating;
a dual-element optical sensor as at least one of the first and second optical sensors; and
a calculation unit that processes two signals that are output from the dual-element optical sensor.

23. The displacement measurement device according to claim 20, wherein one of the first and second diffraction gratings and one of the third and fourth diffraction gratings are provided with two areas that respectively include grating patterns having a same grating pitch, and the entire grating pattern of one of the areas is offset relative to the grating pattern of the other area by an offset amount that is one of one-half, one-quarter, and three-quarter of the grating pitch, the displacement measurement device further comprising:
a dual-element optical sensor as at least one of the first and second optical sensors; and
a calculation unit that processes two signals that are output from the dual-element optical sensor.

24. The displacement measurement device according to claim 20, wherein the light source, the collimator lens, the first diffraction grating, the second diffraction grating, and the first optical sensor are provided in spaces formed inside of a transparent resin molded body,
wherein the third diffraction grating is disposed on one end surface of the transparent resin molded body,
wherein the fourth diffraction grating and the second optical sensor are disposed outside of the transparent resin molded body such that the fourth diffraction grating faces the third diffraction grating,
wherein the transparent resin molded body has a spring characteristic that allows the transparent resin molded body to expand and shrink between the first diffraction grating and the second diffraction grating while keeping the first and second diffraction gratings in parallel with each other, and
wherein the fourth diffraction grating is moveable relative to the transparent resin molded body.

* * * * *